(12) United States Patent
Song et al.

(10) Patent No.: US 10,879,973 B2
(45) Date of Patent: Dec. 29, 2020

(54) METHOD AND APPARATUS FOR USING A DETERMINED COMPRESSION MATRIX TO FORM A SET OF COMPOSITE BEAMS

(71) Applicant: Lenovo (Singapore) Pte. Ltd., New Tech Park (SG)

(72) Inventors: Jiho Song, Ulsan (KR); Tyler Brown, Lake Zurich, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/149,623

(22) Filed: Oct. 2, 2018

(65) Prior Publication Data

US 2019/0103904 A1  Apr. 4, 2019

Related U.S. Application Data

(60) Provisional application No. 62/567,169, filed on Oct. 2, 2017.

(51) Int. Cl.
| | |
|---|---|
| *H04B 7/0456* | (2017.01) |
| *H04L 5/00* | (2006.01) |
| *H04B 7/0417* | (2017.01) |
| *H04B 7/06* | (2006.01) |

(52) U.S. Cl.
CPC ......... *H04B 7/0486* (2013.01); *H04B 7/0417* (2013.01); *H04B 7/0478* (2013.01); *H04B 7/0665* (2013.01); *H04B 7/0695* (2013.01); *H04L 5/0048* (2013.01)

(58) Field of Classification Search
CPC .. H04B 7/0486; H04B 7/0695; H04B 7/0478; H04B 7/0665; H04B 7/0417; H04L 5/0048; H04L 25/0391; H04L 25/03929
See application file for complete search history.

(56) References Cited

U.S. PATENT DOCUMENTS

| | | | |
|---|---|---|---|
| 9,231,674 B1 * | 1/2016 | Yang | H04B 7/0426 |
| 10,419,090 B2 * | 9/2019 | Zhang | H04B 7/0658 |

(Continued)

OTHER PUBLICATIONS

PCT International Search Report for PCT/IB2018/001209, Lenovo (Singapore) Pte. Ltd., dated Mar. 4, 2019.

(Continued)

*Primary Examiner* — Un C Cho
*Assistant Examiner* — Kenan Cehic
(74) *Attorney, Agent, or Firm* — Loppnow & Chapa

(57) ABSTRACT

A method and apparatus in a wireless communication device is provided. A reference signal is received from a network entity, and a default set of individual beams is defined, each of the beams having an associated direction. A compression matrix is determined, and an indication of the determined compression matrix is sent to the network entity. The compression matrix is applied to the default set of individual beams resulting in a new set of composite beams, where at least one of the composite beams includes a combination of multiple individual beams from the default set, and where the multiple individual beams included in the at least one of the composite beams each extend in a different direction. A set of beam weighting values is determined, and the determined set of beam weighting values is sent to the network entity.

20 Claims, 17 Drawing Sheets

(56) References Cited

U.S. PATENT DOCUMENTS

| | | | |
|---|---|---|---|
| 2004/0026253 A1* | 2/2004 | Leddy | B01D 39/04 |
| | | | 205/50 |
| 2007/0277082 A1* | 11/2007 | Matsumoto | H03M 13/6306 |
| | | | 714/801 |
| 2010/0266122 A1* | 10/2010 | Suzaki | H04L 9/002 |
| | | | 380/28 |
| 2013/0084570 A1* | 4/2013 | Hatzis | G06F 19/34 |
| | | | 435/6.11 |
| 2013/0201895 A1* | 8/2013 | Smallcomb | H04L 1/0041 |
| | | | 370/312 |
| 2014/0079105 A1* | 3/2014 | Xiao | H04M 11/062 |
| | | | 375/222 |
| 2015/0304008 A1* | 10/2015 | Wang | H04B 7/0634 |
| | | | 375/267 |
| 2016/0254939 A1* | 9/2016 | Miyazaki | H04L 25/03891 |
| | | | 375/341 |
| 2016/0336964 A1* | 11/2016 | Khalil | H03M 13/114 |
| 2017/0257230 A1 | 9/2017 | Son et al. | |
| 2018/0084600 A1* | 3/2018 | Prasad | H04W 24/08 |
| 2018/0145737 A1* | 5/2018 | Rahman | H04B 7/0626 |
| 2018/0262253 A1* | 9/2018 | Rahman | H04B 7/0626 |
| 2019/0059058 A1* | 2/2019 | Chen | H04W 52/18 |
| 2019/0103904 A1* | 4/2019 | Song | H04B 7/0486 |
| 2019/0109626 A1* | 4/2019 | Park | H04B 7/0636 |
| 2019/0349034 A1* | 11/2019 | Manolakos | H04L 5/0057 |

OTHER PUBLICATIONS

"RAN1 Chairman's Notes" for 3GPP TSG RAN WG1 Meeting #89, Hangzhou, P.R. China, May 15-19, 2017.

Samsung et al., "WF on Type I and II CSI codebooks", R1-1709232, for 3GPP TSG RAN WG1 #89, Hangzhou, China, May 15-19, 2017.

Huawei et al., "The remaining issues for Type II codebook", R1-1710454, for 3GPP TSG RAN WG1 NR Ad-Hoc Meeting, Qingdao, China, Jun. 27-30, 2017.

Samsung, "On higher rank (3 and 4) Type II CSI", R1-1710674, for 3GPP TSG RAN WG1 NR Ad-Hoc #2, Qingdao, China, Jun. 27-30, 2017.

Motorola Mobility et al., "Discussion on higher rank Type II codebook and feedback overhead reduction", R1-1714217, for 3GPP TSG RAN WG1 #90, Prague, Czech Republic, Aug. 21-25, 2017.

* cited by examiner

METHOD AND APPARATUS FOR USING A DETERMINED COMPRESSION MATRIX TO FORM A SET OF COMPOSITE BEAMS

FIELD OF THE INVENTION

The present disclosure is directed to a method and apparatus for formulating a compression matrix, and more specifically the use of a compression matrix for forming a set of composite beams in support of wireless communication.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, user equipment can make use of channel state information codebooks, which help to define the nature of the adopted beams, which are used to support a particular data connection. Higher rank codebooks can sometimes be used to enhance system performance, but often at the price of an increase in the amount of feedback overhead.

The present inventors have recognized, that by incorporating the use of a compression matrix in conjunction with a higher rank channel state information codebook, it may be possible to limit and/or avoid any significant increase in the amount of associated feedback overhead while still enjoying at least some of the benefits corresponding to the use of a higher rank channel state information codebook.

SUMMARY

Presently, user equipment, such as wireless communication devices, communicate with other communication devices using wireless signals. According to a possible embodiment, a method in a wireless communication device is provided. The method includes receiving a reference signal from a network entity, and defining a default set of individual beams, each of the beams having an associated direction. The method further includes determining a compression matrix, and sending an indication of the determined compression matrix to the network entity. The compression matrix is applied to the default set of individual beams resulting in a new set of composite beams, where at least one of the composite beams includes a combination of multiple individual beams from the default set, and where the multiple individual beams included in the at least one of the composite beams each extend in a different direction. A set of beam weighting values is determined, and the determined set of beam weighting values is sent to the network entity.

According to a possible embodiment, a wireless communication device is provided. The wireless communication device includes a transceiver that receives a reference signal from a network entity, and communicates wirelessly with a network entity using a resulting new set of composite beams. The wireless communication device further includes a controller that defines a default set of individual beams, each of the beams having an associated direction of extension. The controller further determines a compression matrix, and applies the compression matrix to the default set of individual beams resulting in a new set of composite beams, as well as sends an indication of the determined compression matrix to the network entity. At least one of the composite beams includes a combination of multiple individual beams from the default set, and the multiple individual beams included in the at least one of the composite beams each extend in a different direction. A set of beam weighting values is determined and sent to the network entity.

According to a possible embodiment, a method in a network entity is provided. The method includes transmitting a reference signal, and receiving an indication of a determined compression matrix from a wireless communication device to be applied to a defined default set of individual beams, each of the beams having an associated direction. The compression matrix is applied to the default set of individual beams resulting in a new set of composite beams, where at least one of the composite beams includes a combination of multiple individual beams from the default set, and where the multiple individual beams included in the at least one of the composite beams each extend in a different direction. A determined set of beam weighting values is received from the wireless communication device. The determined set of beam weighting values is applied to the resulting new set of composite beams in support of wireless communications between the network entity and the wireless communication device.

According to a possible embodiment, a network entity is provided. The network entity includes a transceiver that transmits a reference signal, and receives an indication of a determined compression matrix from a wireless communication device to be applied to a defined default set of individual beams, each of the beams having an associated direction. The network entity further includes a controller that applies the compression matrix to the default set of individual beams resulting in a new set of composite beams, where at least one of the composite beams includes a combination of multiple individual beams from the default set, and where the multiple individual beams included in the at least one of the composite beams each extend in a different direction. The controller further applies a determined set of beam weighting values to the resulting new set of composite beams in support of communications wirelessly between the network entity and the wireless communication device after the determined set of beam weighting values is received via the transceiver from the wireless communication device.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
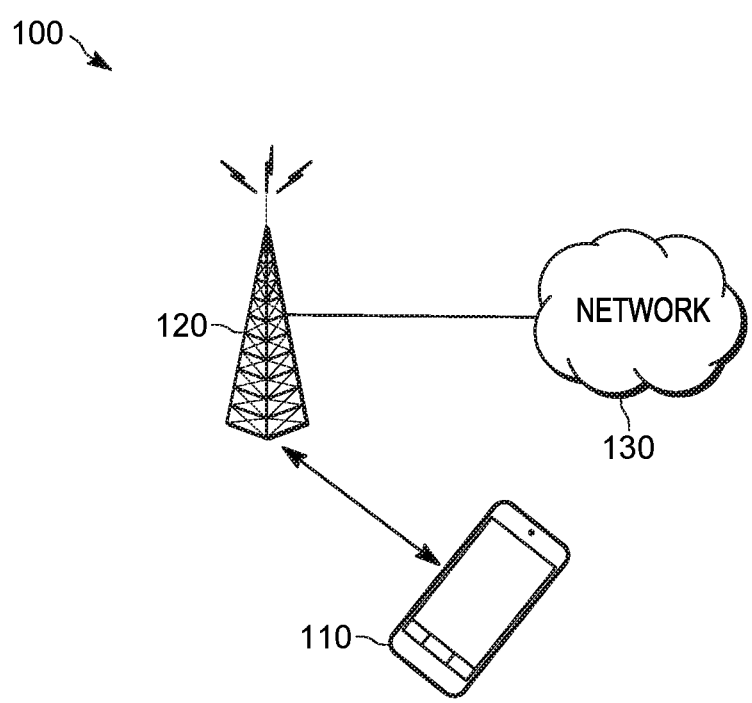
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus which are suitable for using a determined compression matrix to form a set of composite beams. In some instances, this can allow for performing high-resolution beamforming with higher rank channel state information codebook.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In the 89$^{th}$ RAN1 meeting, Type II channel state information (CSI) codebook (CB) was agreed for supporting full-dimension (FD) multiple-input multiple-output (MIMO) in R1-1709232, "WF on Type I and II CSI codebooks"; and 3GPP, RAN1 #89, Chairman's Notes. It is verified that the rank 1-2 Type II CSI codebook gives better data-rate performances than previous Release 14 CSI codebook. Although the low rank Type II codebook improves system performances, it could be beneficial to develop high resolution CSI codebook which might better exploit the benefits of FD-MIMO systems. One straightforward solution is to extend the Type II codebook based on the codebook design principle agreed in R1-1709232, "WF on Type I and II CSI codebooks".

It is expected that the rank >2 Type II codebook will increase system performance gain because performance gain can be obtained by multiplexing above that provided by improved spatial diversity and array gain when UEs employ 4 receive antennas, please see R1-1710674, "On higher rank (rank 3 and 4) Type II CSI"; R1-1710454, "The remaining issues for Type II codebook"; and R1-1714217, "Discussion on higher rank Type II codebook and feedback overhead reduction". However, a simple extension of the current Type II codebook would cause a burden on feedback links since feedback overhead would increase proportionally to a number of maximum transmission ranks. In this disclosure, we thus propose channel compressing algorithms to improve system performance with less feedback overhead compared to the rank >2 Type II codebook.

The present disclosure is organized, as follows. In at least one section, we review the Type II CSI codebook. In a further section, a channel compressing algorithm and a compressing matrix design algorithm are proposed. In a still further section, wideband (WB) and subband (SB) quantizers are developed based on the proposed channel compressing algorithm. In a still further section, numerical simulations are presented, and lastly a section details our conclusions.

Throughout this disclosure, $\mathbb{C}$ denotes the field of complex numbers, $\mathbb{R}$ denotes the field of real numbers, $\|\cdot\|_p$ is the p-norm, $\|\cdot\|_F$ is the frobenius norm, $\odot$ is the Hadamard product, $\otimes$ is the Kronecker product, $a^H$ is the conjugate transpose of the column vector a, $0_{a \times b}$ is the a×b all zeros matrix, $I_N$ is the N×N identity matrix, $v_{max}\{A\}$, $\lambda_{max}\{A\}$, and $e_{max}\{A\}$ denote the principal right singular vector, the principal singular value, and the principal eigenvector of the matrix A.

Type II Codebook—Review

In the Type II CSI agreement in R1-1709232, "WF on Type I and II CSI codebooks"; and 3GPP, RAN1 #89, Chairman's Notes, a channel matrix consisting of MIMO channel matrices $H(w) \in \mathbb{C}^{2N_{rx} \times 2N_{tx}}$ for w total subcarriers $$H=[H(1)^T, \ldots, H(W)^T]^T \in \mathbb{C}^{2N_{rx}W \times 2N_{tx}}$$

is compressed in WB such that $$H^{BS} \doteq H(I_2 \otimes B) \in \mathbb{C}^{2N_{rx}W \times 2L} \quad (1)$$

by exploiting a set of L selected discrete Fourier transform (DFT) beams, i.e., $B:=[b_1, \ldots, b_L] \in \mathbb{C}^{N_{tx} \times L}$. The beam selection technique is explained in R1-1709232, "WF on Type I and II CSI codebooks"; and 3GPP, RAN1 #89, Chairman's Notes. Note that $N_{tx}$ is the number of transmit antenna ports and $N_{rx}$ is the number of receive antenna ports for each polarization. The realistic MIMO channels are spatially correlated and the channel matrix consists of only a limited number of dominant (meaningful) propagation paths. The channel compressing procedure based on B is effective for quantizing high resolution CSI because the set of selected DFT beams captures the characteristics of the MIMO channels. For the rest of this disclosure, we call the compressed channel matrix as a beamspace channel matrix.

After constructing the beamspace channel matrix in WB, the 2L-dimensional right dominant singular vector of beamspace channel matrix $$H^{BS}[s]=[H(1+(s-1)W/S)^T, \ldots, H(sW/S)^T]^T(I_2 \otimes B) \in \mathbb{C}^{2N_{rx}W/S \times 2L} \quad (2)$$

is quantized in each SB, $s \in \{1, \ldots S\}$, to generate a precoding vector for each transmission layer. Note that s denotes the number of SBs. Quantizing the 2L-dimensional vector is a layer and SB specific process so that total feedback overhead for SB CSI reporting would increase proportionally to the number of maximum transmission layers and the number of SBs.

Channel Matrix Compressing Algorithm

It is beneficial to support rank >2 multiuser (MU) transmission based on high resolution CSI to better exploit the benefits of systems with multiple RX UEs. One simple solution is to extend the Type II codebook for rank 1-4. To compute rank 3-4 precoding vectors, we could make the same quantization approach with that for rank 1-2 precoding vectors in the Type II codebook. To be more specific, 2L-dimensional basis combining vectors should be quantized in each SB for computing rank 3-4 precoding vectors. However, if we simply extend the Type II codebook, the total feedback overhead for higher rank Type II (rank 1-4) SB CSI reporting would be twice that for Type II (rank 1-4) SB CSI reporting. Therefore, a high rank codebook should be designed carefully by considering limited feedback resources.

We developed a high resolution CSI codebook that can support higher rank transmission with less feedback overhead compared to the Type II CSI codebook. To reduce the number of basis vectors, a beamspace matrix $H^{BS}$ is additionally compressed such as $$H^{BS}_{comp} = H^{BS}G \quad (3)$$
$$= H(I_2 \otimes B)G \in \mathbb{C}^{2N_{rx}W \times \tilde{L}},$$

where $G \in \mathbb{C}^{2L \times \tilde{L}}$ denotes the channel compressing matrix and $\tilde{L} < 2L$ denotes the channel compressing level.

To compress the beamspace matrix effectively, the channel compressing matrix in (3) should satisfy following matrix design criteria. Compressed channel matrix is designed to
  i. Have orthogonal compressing vectors, and
  ii. Contain more channel gains.

A. Compressing Matrix Selection

Before presenting compressing matrix design algorithms, we pause to formulate an optimization problem for computing a more optimal compressing matrix Gr in the r-th transmission layer. Based on the assumption that compressing vectors are orthogonal, the optimization problem are derived as $$G_r = \underset{\tilde{G} \in \mathbb{C}^{2L \times \tilde{L}}}{\arg\max} \left[ \max_{\tilde{w} \in \mathbb{C}^{\tilde{L}}} \frac{\|H_r^{BS}\tilde{G}\tilde{w}\|_2^2}{\|\tilde{G}\tilde{w}\|_2^2} \right] \quad (4)$$

$$\overset{(a)}{=} \underset{\tilde{G} \in \mathbb{C}^{2L \times \tilde{L}}}{\arg\max} \left[ \max_{\tilde{w} \in \mathbb{C}^{\tilde{L}}} \|H_r^{BS}\tilde{G}\tilde{w}\|_2^2 \right]$$

$$\overset{(b)}{=} \underset{\tilde{G} \in \mathbb{C}^{2L \times \tilde{L}}}{\arg\max} \left[ \max_{\tilde{w} \in \mathbb{C}^{\tilde{L}}} \|H^{BS}_{r,comp|\tilde{G}}\tilde{w}\|_2^2 \right]$$

$$\overset{(c)}{=} \underset{\tilde{G} \in \mathbb{C}^{2L \times \tilde{L}}}{\arg\max} \|H^{BS}_{r,comp|\tilde{G}} \tilde{w}_{|\tilde{G}}\|_2^2$$

$$= \underset{\tilde{G} \in \mathbb{C}^{2L \times \tilde{L}}}{\arg\max} \lambda_{max}(H^{BS}_{r,comp|\tilde{G}}), \quad (5)$$

where $w \in \mathbb{C}^L$ is the L-dimensional (unit norm) basis combining vector that will be computed in each SB, and $H_r^{BS}$ is the beamspace matrix to be considered in the r-th transmission layer. Note that (a) is derived because the dominator of the likelihood function in (4) is rewritten as $$\|\tilde{G}\tilde{w}\|_2^2 = \|\tilde{w}\|_2^2 = 1,$$

and (b) is derived by definition $H^{BS}_{r,comp|\tilde{G}} = H_r^{BS}\tilde{G}$ for a given compressing matrix $\tilde{G}$, and (c) is derived because the optimal basis combining vector is computed as $$\tilde{w}_{|\tilde{G}} = v_{max}(H^{BS}_{r,comp|\tilde{G}}) \in \mathbb{C}^{\tilde{L}}.$$

Based on the formulation in (5), we propose to choose a channel compressing matrix that better maximizes a principal singular value of the compressed channel matrix. For a given channel compressing matrix $G_r$, a compressed channel matrix, which is used to quantize WB precoding matrix indicator (PMI), in WB is defined as $$H^{BS}_{r,comp} = H_r^{BS}G_r \in \mathbb{C}^{2N_{rx}W \times \tilde{L}},$$

and a compressed channel matrix in each SB, which is used to quantize SB PMI, is defined as $$H^{BS}_{r,comp}[s] = H_r^{BS}[s]G_r \in \mathbb{C}^{2N_{rx}W/S \times \tilde{L}}, s \in \{1, \ldots, S\}.$$

B. Empirical Study—Channel Gains Contained in Selected DFT Beams

We next discuss distributions of channel gains that are contained in selected DFT beams B in (1). For verifying the channel gain distributions, we compute the normalized channel gains contained in each DFT beam such that $$\tilde{\gamma}_\ell^2 = \frac{\gamma_\ell^2}{\sum_{\ell=1}^{L} \gamma_\ell^2},$$

$$\gamma_\ell^2 = \|H(I_2 \otimes b_\ell)\|_F^2.$$

Figure 2A:
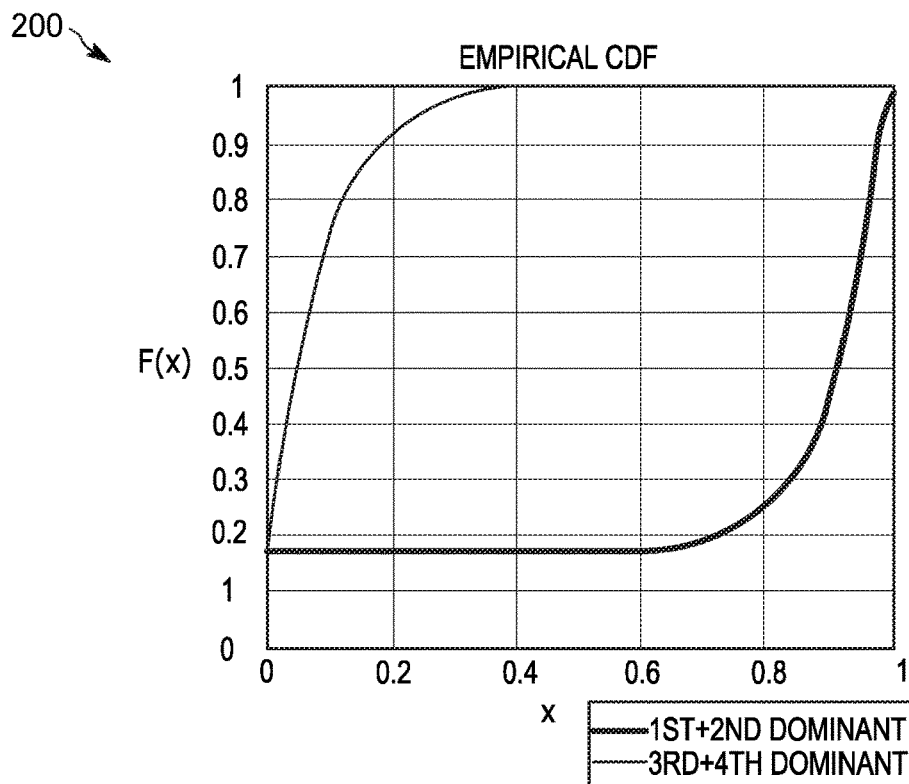
FIGS. 2A and 2B are graphs illustrating an exemplary cumulative distribution function (cdf) of the normalized channel gains or power in beam direction of selected discrete Fourier transform (DFT) beams in wideband (WB) for one or more dominant beams.
Figure 2B:
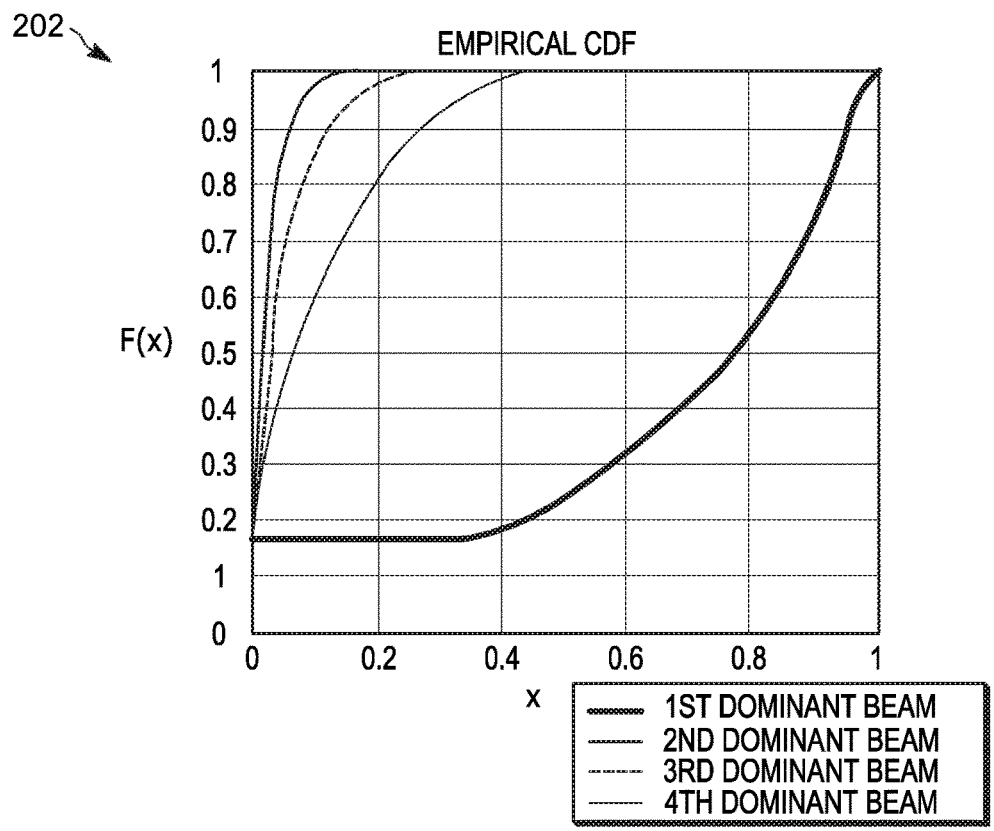

Exemplary cumulative distribution functions (cdf) 200 and 202 of the normalized channel gains are depicted in FIGS. 2A and 2B, which illustrating Empirical cdf of normalized power in beam direction of selected DFZT beams in WB. It is shown in FIG. 2A that more than 83% of channel gains are contained in beam directions of first and second dominant DFT beams (with probability of 0.7) and in FIG. 2B, that more than 58% of channel gains are contained in a beam direction of first dominant DFT beam (with probability of 0.7). Most of channel gains are contained in first and second dominant beams and only small amount of channel gains are contained in third and fourth dominant beams. We thus propose to develop compressing matrix design algorithms by considering the channel gain distributions.

C. Compressing Matrix Design Algorithms

We now develop compressing matrix design algorithms. In the proposed algorithms, a compressing matrix is layer specific so that the matrix is computed independently in each layer. In this disclosure, we predefine beam combining patterns that satisfy the first matrix design criterion (i.e., compressing vectors in a channel compressing matrix are orthogonal). We propose to define the channel compressing matrix in (3) such that $$G_r = \begin{bmatrix} A_r^h & 0_{L \times \tilde{L}/2} \\ 0_{L \times \tilde{L}/2} & A_r^v \end{bmatrix} \in \mathbb{C}^{2L \times \tilde{L}}, \quad (6)$$

$$A_r^a = [a_1^a, \ldots, a_{\tilde{L}/2}^a] \in \mathbb{C}^{L \times \tilde{L}/2},$$

where $A_r^a$ denotes the sub-matrix for each polarization $a \in \{h, v\}$ and $a_l^a \in \mathbb{C}^L$ is the (unit norm) compressing vector.

C-1. Matrix Design I

In matrix design I, we assume that both horizontal and vertical polarizations share the same compressing sub-matrix $$A_r^a = A_r, a \in \{h, v\}.$$

The compressing matrix in (6) is then rewritten as $$G_r = \begin{bmatrix} A_r & 0_{L \times \tilde{L}/2} \\ 0_{L \times \tilde{L}/2} & A_r \end{bmatrix} \in \mathbb{C}^{2L \times \tilde{L}},$$

$$A_r = [a_1, \ldots, a_{\tilde{L}/2}] \in \mathbb{C}^{L \times \tilde{L}/2}.$$

C-1-1. Matrix Design I—Alt 0: Phase Alignment Without Power Control

Based on the empirical studies in part B of the Channel Matrix Compressing Algorithm Section, we propose to choose first dominant beam or choose and combine first and second dominant beams in B. The remaining beams are combined to generate a second compressing vector $a_2$. The compressing vectors are chosen from the compressing pattern codebooks, where in the particular example illustrated the channel compressing level is set to $\tilde{L}=4$, and $$\mathcal{A}_2(\theta, \phi) = \left\{ \begin{bmatrix} 1 & 0 \\ 0 & \frac{1}{\sqrt{3}} \\ 0 & \frac{e^{j\theta}}{\sqrt{3}} \\ 0 & \frac{e^{j\phi}}{\sqrt{3}} \end{bmatrix}, \begin{bmatrix} 0 & \frac{1}{\sqrt{3}} \\ 1 & 0 \\ 0 & \frac{e^{j\theta}}{\sqrt{3}} \\ 0 & \frac{e^{j\phi}}{\sqrt{3}} \end{bmatrix}, \begin{bmatrix} 0 & \frac{1}{\sqrt{3}} \\ 0 & \frac{e^{j\theta}}{\sqrt{3}} \\ 1 & 0 \\ 0 & \frac{e^{j\phi}}{\sqrt{3}} \end{bmatrix}, \begin{bmatrix} 0 & \frac{1}{\sqrt{3}} \\ 0 & \frac{e^{j\theta}}{\sqrt{3}} \\ 0 & \frac{e^{j\phi}}{\sqrt{3}} \\ 1 & 0 \end{bmatrix} \right\}, \quad (7)$$

1p;2p $$\mathcal{A}_3(\theta, \phi) = \quad (8)$$

$$\left\{ \begin{bmatrix} 1 & 0 \\ 0 & \frac{1}{\sqrt{3}} \\ 0 & \frac{e^{j\theta}}{\sqrt{3}} \\ 0 & \frac{e^{j\phi}}{\sqrt{3}} \end{bmatrix}, \begin{bmatrix} 0 & \frac{1}{\sqrt{3}} \\ 1 & 0 \\ 0 & \frac{e^{j\theta}}{\sqrt{3}} \\ 0 & \frac{e^{j\phi}}{\sqrt{3}} \end{bmatrix}, \begin{bmatrix} 0 & \frac{1}{\sqrt{3}} \\ 0 & \frac{e^{j\theta}}{\sqrt{3}} \\ 1 & 0 \\ 0 & \frac{e^{j\phi}}{\sqrt{3}} \end{bmatrix}, \begin{bmatrix} 0 & \frac{1}{\sqrt{3}} \\ 0 & \frac{e^{j\theta}}{\sqrt{3}} \\ 0 & \frac{e^{j\phi}}{\sqrt{3}} \\ 1 & 0 \end{bmatrix}, \begin{bmatrix} \frac{1}{\sqrt{2}} & 0 \\ \frac{e^{j\theta}}{\sqrt{2}} & 0 \\ 0 & \frac{1}{\sqrt{2}} \\ 0 & \frac{e^{j\phi}}{\sqrt{2}} \end{bmatrix}, \begin{bmatrix} \frac{1}{\sqrt{2}} & 0 \\ 0 & \frac{1}{\sqrt{2}} \\ \frac{e^{j\theta}}{\sqrt{2}} & 0 \\ 0 & \frac{e^{j\phi}}{\sqrt{2}} \end{bmatrix}, \begin{bmatrix} \frac{1}{\sqrt{2}} & 0 \\ 0 & \frac{1}{\sqrt{2}} \\ 0 & \frac{e^{j\phi}}{\sqrt{2}} \\ \frac{e^{j\theta}}{\sqrt{2}} & 0 \end{bmatrix} \right\},$$

includes 4 or 7 predefined compressing patterns. For a given set of combing phases $\{\theta, \phi\}$, the 2-bit pattern codebook $\mathcal{A}_2(\theta, \phi)$ is designed to select a single dominant beam and combine remaining beams in B. In addition to $\mathcal{A}_2(\theta, \phi)$, the 3-bit pattern codebook $\mathcal{A}_3(\theta, \phi)$ is designed to combine first and second dominant beams and combine third and fourth dominant beams. In compressing patterns, each column represents a predefined unit norm channel compressing vector. Amplitude of coefficients in each column vector should be normalized to have a unit norm gain.

Figure 3:
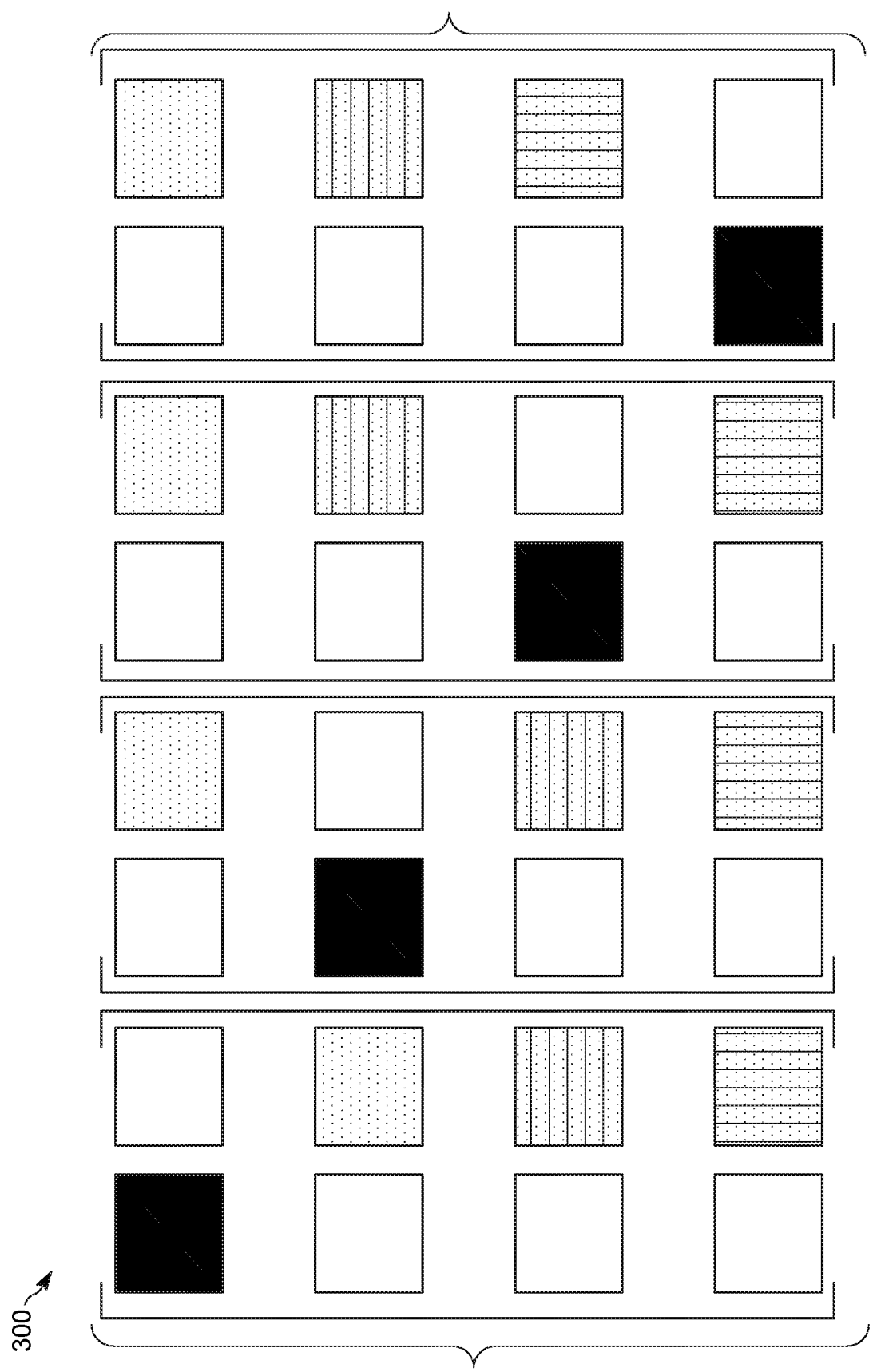
FIG. 3 is an exemplary 2-bit compressing pattern codebook in (7) for matrix design I—alt 0.
Figure 4:
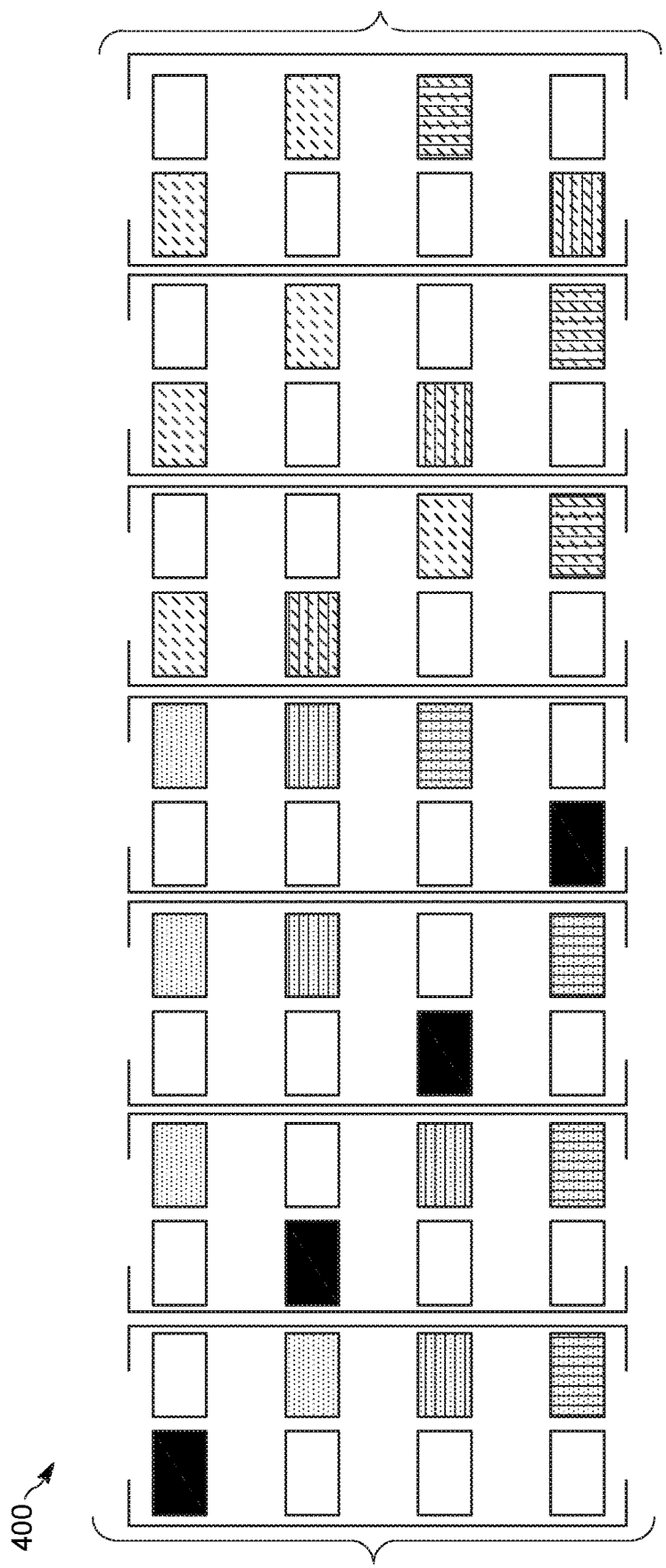
FIG. 4 is an exemplary 3-bit compressing pattern codebook in (8) for matrix design I—alt 0.

The 2-bit compressing pattern codebook 300 in (7) and 3-bit compressing pattern codebook 400 in (8) are depicted in FIG. 3 and FIG. 4, respectively. In the figures, each pattern in a first set of patterns represents an amplitude level and each pattern in a second set of patterns represents a phase. As depicted in FIGS. 3 and 4, amplitudes in each column are the same, while phases in each column are different.

The compressing matrix is chosen using the compressing pattern codebooks $$G_r = \begin{bmatrix} A(\theta, \phi) & 0_{L \times \tilde{L}/2} \\ 0_{L \times \tilde{L}/2} & A(\theta, \phi) \end{bmatrix} = I_2 \otimes A(\theta, \phi),$$

$$A(\theta, \phi) = \operatorname*{argmax}_{\tilde{A}(\tilde{\theta},\tilde{\phi}) \in \mathcal{A}_{B_{pat}}(\tilde{\theta},\tilde{\phi})} \lambda_{max}\left(H_r^{BS}(I_2 \otimes \tilde{A}(\tilde{\theta}, \tilde{\phi}))\right),$$

where $\tilde{\theta}, \tilde{\phi} \in \mathcal{Z}_B^{phase}$ and the phase codebook including $2^B$ phase entries is defined as $$\mathcal{Z}_B^{phase} = \{0, \ldots, 2\pi(2^B-1)/2^B\}. \quad (9)$$

The proposed performance metric in (5), i.e., principal singular value of the compressed beamspace matrix, is used to evaluate predefined compressing patterns for a given set of combining phases.

C-1-2. Matrix Design I—Alt 1: Phase Alignment with Power Control

In the previous subsection, we did not consider power control between amplitude coefficients in compressing vector. Therefore, amplitude of combining coefficients in each column vector are set to have the same amplitude. To increase system performances, we would assign different amplitude scaling factors based on the amplitude codebook $$\mathcal{Z}_B^{amp} = \{0, (1/\sqrt{2})^0, (1/\sqrt{2})^1, \ldots, (1/\sqrt{2})^{2^B-2}\}, \quad (10)$$

including $2^B$ amplitude entries. The compression pattern codebooks in (7) and (8) are then rewritten as design I - Alt 1

$$\mathcal{A}_2(\alpha_1, \ldots, \alpha_3, \theta, \phi) = \left\{ \begin{bmatrix} 1 \\ 0 \\ 0 \\ 0 \end{bmatrix}, \begin{bmatrix} 0 \\ \frac{\alpha_1}{\sqrt{\alpha_1^2+\alpha_2^2+\alpha_3^2}} \\ \frac{\alpha_2 e^{j\theta}}{\sqrt{\alpha_1^2+\alpha_2^2+\alpha_3^2}} \\ \frac{\alpha_3 e^{j\phi}}{\sqrt{\alpha_1^2+\alpha_2^2+\alpha_3^2}} \end{bmatrix}, \begin{bmatrix} 0 \\ \frac{\alpha_1}{\sqrt{\alpha_1^2+\alpha_2^2+\alpha_3^2}} \\ 1 \\ 0 \\ \frac{\alpha_2 e^{j\theta}}{\sqrt{\alpha_1^2+\alpha_2^2+\alpha_3^2}} \\ \frac{\alpha_3 e^{j\phi}}{\sqrt{\alpha_1^2+\alpha_2^2+\alpha_3^2}} \end{bmatrix}, \begin{bmatrix} 0 \\ \frac{\alpha_1}{\sqrt{\alpha_1^2+\alpha_2^2+\alpha_3^2}} \\ 0 \\ \frac{\alpha_2 e^{j\theta}}{\sqrt{\alpha_1^2+\alpha_2^2+\alpha_3^2}} \\ 1 \\ 0 \\ \frac{\alpha_3 e^{j\phi}}{\sqrt{\alpha_1^2+\alpha_2^2+\alpha_3^2}} \end{bmatrix}, \begin{bmatrix} 0 \\ \frac{\alpha_1}{\sqrt{\alpha_1^2+\alpha_2^2+\alpha_3^2}} \\ 0 \\ \frac{\alpha_2 e^{j\theta}}{\sqrt{\alpha_1^2+\alpha_2^2+\alpha_3^2}} \\ 0 \\ \frac{\alpha_3 e^{j\phi}}{\sqrt{\alpha_1^2+\alpha_2^2+\alpha_3^2}} \\ 1 \end{bmatrix} \right\}, \quad (11)$$

$$\mathcal{A}_3(\alpha_1, \ldots, \alpha_4, \theta, \phi) = \quad (12)$$

$$\left\{ \begin{bmatrix} \frac{\alpha_4}{\alpha_4} & 0 \\ 0 & \frac{\alpha_1}{\sqrt{\alpha_1^2+\alpha_2^2+\alpha_3^2}} \\ 0 & \frac{\alpha_2 e^{j\theta}}{\sqrt{\alpha_1^2+\alpha_2^2+\alpha_3^2}} \\ 0 & \frac{\alpha_3 e^{j\phi}}{\sqrt{\alpha_1^2+\alpha_2^2+\alpha_3^2}} \end{bmatrix}, \begin{bmatrix} 0 & \frac{\alpha_1}{\sqrt{\alpha_1^2+\alpha_2^2+\alpha_3^2}} \\ \frac{\alpha_4}{\alpha_4} & 0 \\ 0 & \frac{\alpha_2 e^{j\theta}}{\sqrt{\alpha_1^2+\alpha_2^2+\alpha_3^2}} \\ 0 & \frac{\alpha_3 e^{j\phi}}{\sqrt{\alpha_1^2+\alpha_2^2+\alpha_3^2}} \end{bmatrix}, \right.$$

$$\begin{bmatrix} 0 & \frac{\alpha_1}{\sqrt{\alpha_1^2+\alpha_2^2+\alpha_3^2}} \\ 0 & \frac{\alpha_2 e^{j\theta}}{\sqrt{\alpha_1^2+\alpha_2^2+\alpha_3^2}} \\ \frac{\alpha_4}{\alpha_4} & 0 \\ 0 & \frac{\alpha_3 e^{j\phi}}{\sqrt{\alpha_1^2+\alpha_2^2+\alpha_3^2}} \end{bmatrix}, \begin{bmatrix} 0 & \frac{\alpha_1}{\sqrt{\alpha_1^2+\alpha_2^2+\alpha_3^2}} \\ 0 & \frac{\alpha_2 e^{j\theta}}{\sqrt{\alpha_1^2+\alpha_2^2+\alpha_3^2}} \\ 0 & \frac{\alpha_3 e^{j\phi}}{\sqrt{\alpha_1^2+\alpha_2^2+\alpha_3^2}} \\ \frac{\alpha_4}{\alpha_4} & 0 \end{bmatrix},$$

$$\begin{bmatrix} \frac{\alpha_1}{\sqrt{\alpha_1^2+\alpha_2^2}} & 0 \\ \frac{\alpha_2 e^{j\theta}}{\sqrt{\alpha_1^2+\alpha_2^2}} & 0 \\ 0 & \frac{\alpha_3}{\sqrt{\alpha_3^2+\alpha_4^2}} \\ 0 & \frac{\alpha_4 e^{j\phi}}{\sqrt{\alpha_3^2+\alpha_4^2}} \end{bmatrix}, \begin{bmatrix} \frac{\alpha_1}{\sqrt{\alpha_1^2+\alpha_2^2}} & 0 \\ 0 & \frac{\alpha_3}{\sqrt{\alpha_3^2+\alpha_4^2}} \\ \frac{\alpha_2 e^{j\theta}}{\sqrt{\alpha_1^2+\alpha_2^2}} & 0 \\ 0 & \frac{\alpha_4 e^{j\phi}}{\sqrt{\alpha_3^2+\alpha_4^2}} \end{bmatrix},$$

$$\left. \begin{bmatrix} \frac{\alpha_1}{\sqrt{\alpha_1^2+\alpha_2^2}} & 0 \\ 0 & \frac{\alpha_3}{\sqrt{\alpha_3^2+\alpha_4^2}} \\ 0 & \frac{\alpha_4 e^{j\phi}}{\sqrt{\alpha_3^2+\alpha_4^2}} \\ \frac{\alpha_2 e^{j\theta}}{\sqrt{\alpha_1^2+\alpha_2^2}} & 0 \end{bmatrix} \right\},$$

where combining coefficients are in the amplitude codebook $\alpha_1, \ldots, \alpha_4 \in \mathcal{Z}_B^{amp}$. In compressing patterns, each column represents the predefined unit norm channel compressing vector. Amplitude of coefficients in each column vector should be normalized to have a unit norm gain.

Figure 5:
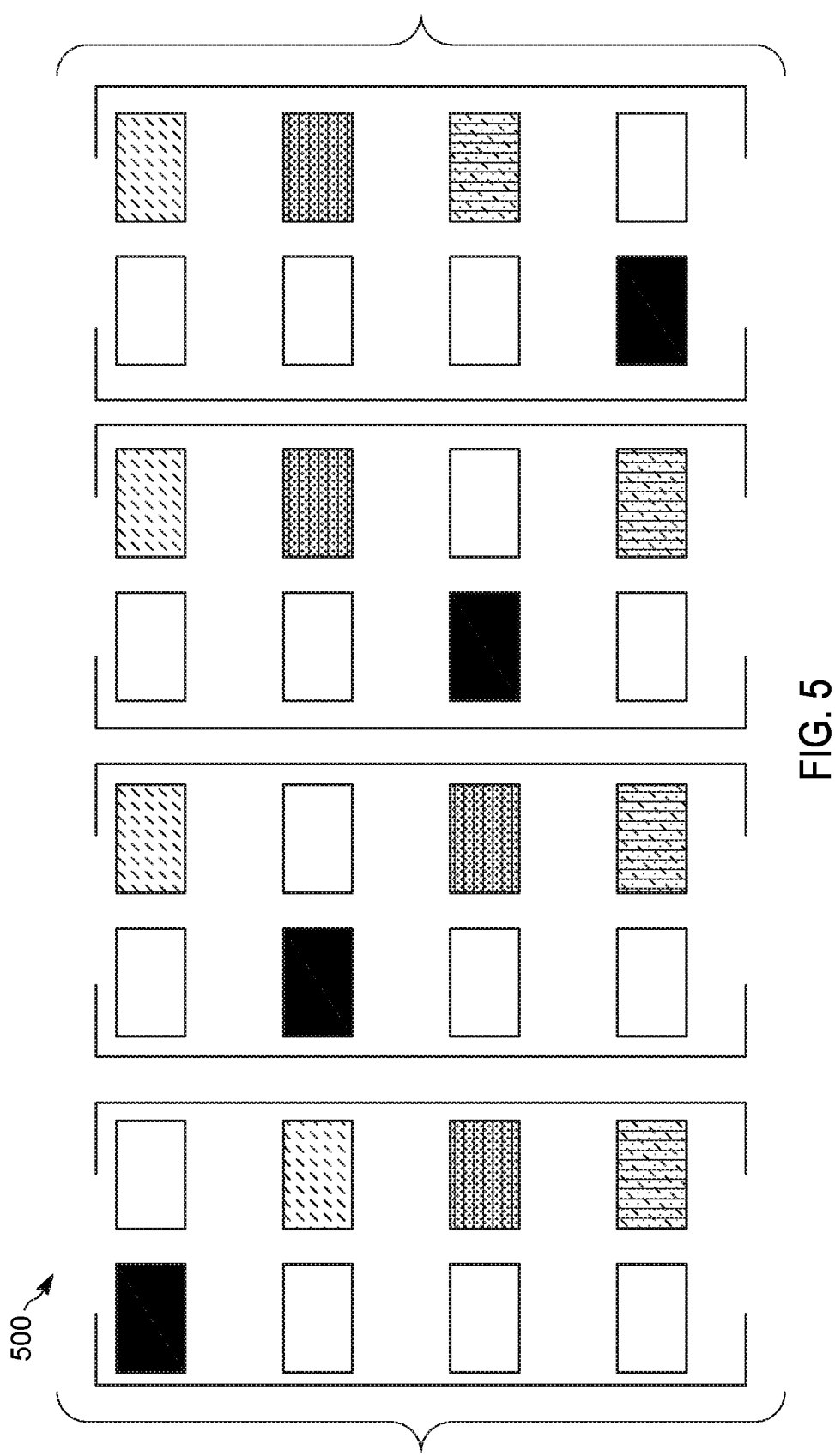
FIG. 5 is an exemplary 2-bit compressing pattern codebook in (11) for matrix design I—alt 1.
Figure 6:
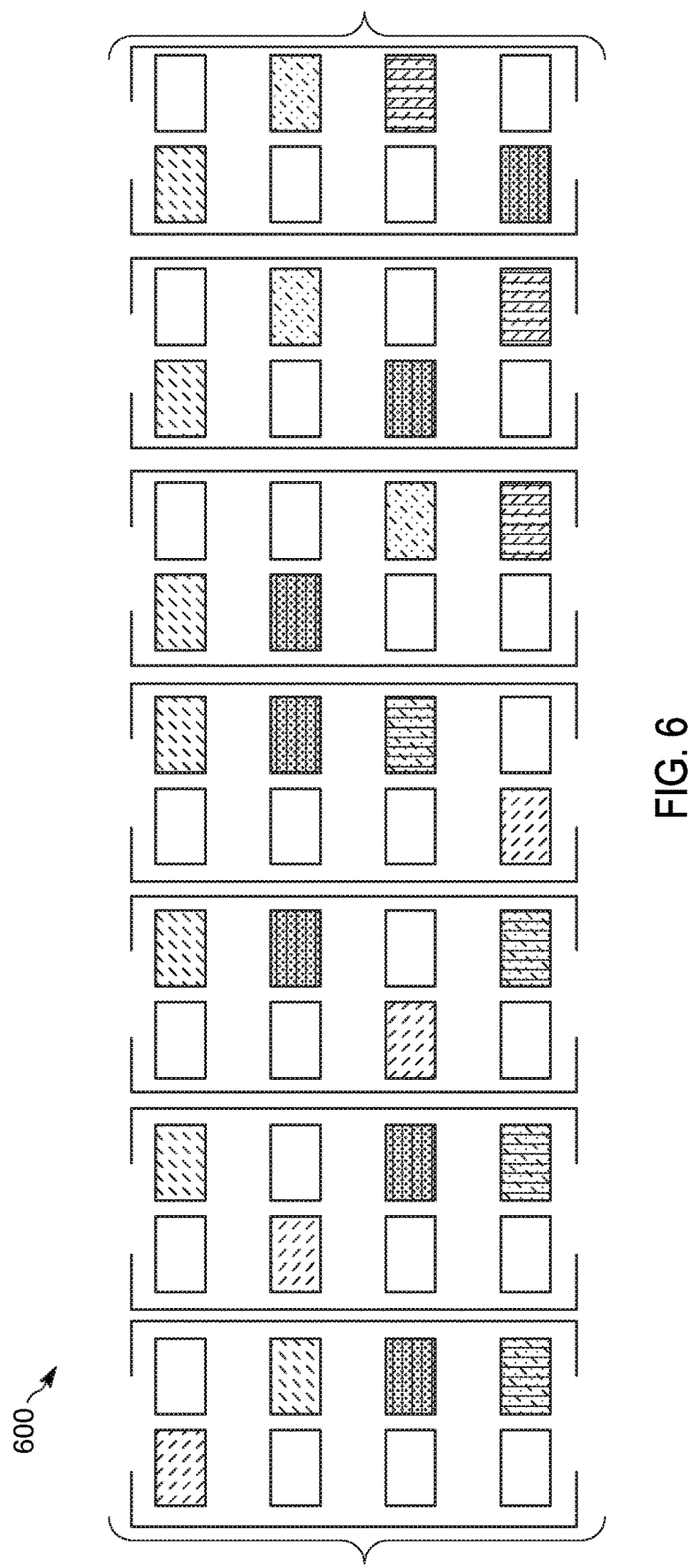
FIG. 6 is an exemplary 3-bit compressing pattern codebook in (12) for matrix design I—alt 1.

The 2-bit compressing pattern codebook 500 in (11) and 3-bit compressing pattern codebook 600 in (12) are depicted in FIG. 5 and FIG. 6, respectively. In the figures, each pattern in a first set of patterns represents an amplitude level and each pattern in a second set of patterns represents a phase. As depicted in the figures, amplitudes and phases in each column are different.

The compressing matrix is chosen using the compressing pattern codebooks $$G_r = \begin{bmatrix} A(\alpha_1, \ldots, \alpha_4, \theta, \phi) & 0_{L \times L/2} \\ 0_{L \times L/2} & A(\alpha_1, \ldots, \alpha_4, \theta, \phi) \end{bmatrix} = I_2 \otimes A(\alpha_1, \ldots, \alpha_4, \theta, \phi),$$

$$A(\alpha_1, \ldots, \alpha_4, \theta, \phi) = \underset{\tilde{A}(\tilde{\alpha}_1, \ldots, \tilde{\alpha}_4, \tilde{\theta}, \tilde{\phi}) \in \mathcal{A}_{B_{pat}}(\tilde{\alpha}_1, \ldots, \tilde{\alpha}_4, \tilde{\theta}, \tilde{\phi})}{\mathrm{argmax}} \; \lambda_{max}\!\left(H_r^{BS}\!\left(I_2 \otimes \tilde{A}(\tilde{\alpha}_1, \ldots, \tilde{\alpha}_4, \tilde{\theta}, \tilde{\phi})\right)\right),$$

where $\tilde{\theta}, \tilde{\phi} \in \mathcal{Z}_B^{phase}$ and $\tilde{\alpha}_1, \ldots, \tilde{\alpha}_4 \in \mathcal{Z}_B^{amp}$. Note that the phase codebook and amplitude codebook are defined in (9) and (10), respectively.

C-2. Matrix Design II

In matrix design II, we assume that combining phases are polarization specific, while a compressing pattern is polarization common.

C-2-1. Matrix Design II—Alt 0: Phase Alignment Without Power Control

Both polarizations share the same compressing pattern so that a compressing sub-matrix for each polarization is chosen as $$G_r = G(\theta^h, \phi^h, \theta^v, \phi^v),$$

$$G(\theta^h, \phi^h, \theta^v, \phi^v) = \underset{\tilde{G}(\tilde{\theta}^h, \tilde{\phi}^h, \tilde{\theta}^v, \tilde{\phi}^v) \in \mathcal{G}_{B_{pat}}(\tilde{\theta}^h, \tilde{\phi}^h, \tilde{\theta}^v, \tilde{\phi}^v)}{\mathrm{argmax}} \; \lambda_{max}\!\left(H_r^{BS} \tilde{G}(\tilde{\theta}^h, \tilde{\phi}^h, \tilde{\theta}^v, \tilde{\phi}^v)\right),$$

$\tilde{\theta}^h, \tilde{\phi}^h, \tilde{\theta}^v, \tilde{\phi}^v \in \mathcal{Z}_B^{phase}$ and the compressing pattern codebooks, where the channel compressing level is set to $\tilde{L}=4$, are defined as $$\mathcal{G}_2(\theta^h, \phi^h, \theta^v, \phi^v) = \left\{ \begin{bmatrix} 1 & 0 & 0 & 0 \\ 0 & \frac{1}{\sqrt{3}} & 0 & 0 \\ 0 & \frac{e^{j\theta^h}}{\sqrt{3}} & 0 & 0 \\ 0 & \frac{e^{j\phi^h}}{\sqrt{3}} & 0 & 0 \\ 0 & 0 & 1 & 0 \\ 0 & 0 & 0 & \frac{1}{\sqrt{3}} \\ 0 & 0 & 0 & \frac{e^{j\theta^v}}{\sqrt{3}} \\ 0 & 0 & 0 & \frac{e^{j\phi^v}}{\sqrt{3}} \end{bmatrix}, \begin{bmatrix} 0 & \frac{1}{\sqrt{3}} & 0 & 0 \\ 1 & 0 & 0 & 0 \\ 0 & \frac{e^{j\theta^h}}{\sqrt{3}} & 0 & 0 \\ 0 & \frac{e^{j\phi^h}}{\sqrt{3}} & 0 & 0 \\ 0 & 0 & 0 & \frac{1}{\sqrt{3}} \\ 0 & 0 & 1 & 0 \\ 0 & 0 & 0 & \frac{e^{j\theta^v}}{\sqrt{3}} \\ 0 & 0 & 0 & \frac{e^{j\phi^v}}{\sqrt{3}} \end{bmatrix}, \begin{bmatrix} 0 & \frac{1}{\sqrt{3}} & 0 & 0 \\ 0 & \frac{e^{j\theta^h}}{\sqrt{3}} & 0 & 0 \\ 1 & 0 & 0 & 0 \\ 0 & \frac{e^{j\phi^h}}{\sqrt{3}} & 0 & 0 \\ 0 & 0 & 0 & \frac{1}{\sqrt{3}} \\ 0 & 0 & 0 & \frac{e^{j\theta^v}}{\sqrt{3}} \\ 0 & 0 & 1 & 0 \\ 0 & 0 & 0 & \frac{e^{j\phi^v}}{\sqrt{3}} \end{bmatrix}, \begin{bmatrix} 0 & \frac{1}{\sqrt{3}} & 0 & 0 \\ 0 & \frac{e^{j\theta^h}}{\sqrt{3}} & 0 & 0 \\ 0 & \frac{e^{j\phi^h}}{\sqrt{3}} & 0 & 0 \\ 1 & 0 & 0 & 0 \\ 0 & 0 & 0 & \frac{1}{\sqrt{3}} \\ 0 & 0 & 0 & \frac{e^{j\theta^v}}{\sqrt{3}} \\ 0 & 0 & 0 & \frac{e^{j\phi^v}}{\sqrt{3}} \\ 0 & 0 & 1 & 0 \end{bmatrix} \right\}, \quad (13)$$

$$\mathcal{G}_3(\theta^h, \phi^h, \theta^v, \phi^v) = \tag{14}$$

$$\left\{ \begin{bmatrix} 1 & 0 & 0 & 0 \\ 0 & \frac{1}{\sqrt{3}} & 0 & 0 \\ 0 & \frac{e^{j\theta^h}}{\sqrt{3}} & 0 & 0 \\ 0 & \frac{e^{j\phi^h}}{\sqrt{3}} & 0 & 0 \\ 0 & 0 & 1 & 0 \\ 0 & 0 & 0 & \frac{1}{\sqrt{3}} \\ 0 & 0 & 0 & \frac{e^{j\theta^v}}{\sqrt{3}} \\ 0 & 0 & 0 & \frac{e^{j\phi^v}}{\sqrt{3}} \end{bmatrix}, \begin{bmatrix} 0 & \frac{1}{\sqrt{3}} & 0 & 0 \\ 1 & 0 & 0 & 0 \\ 0 & \frac{e^{j\theta^h}}{\sqrt{3}} & 0 & 0 \\ 0 & \frac{e^{j\phi^h}}{\sqrt{3}} & 0 & 0 \\ 0 & 0 & 0 & \frac{1}{\sqrt{3}} \\ 0 & 0 & 1 & 0 \\ 0 & 0 & 0 & \frac{e^{j\theta^v}}{\sqrt{3}} \\ 0 & 0 & 0 & \frac{e^{j\phi^v}}{\sqrt{3}} \end{bmatrix}, \begin{bmatrix} 0 & \frac{1}{\sqrt{3}} & 0 & 0 \\ 0 & \frac{e^{j\theta^h}}{\sqrt{3}} & 0 & 0 \\ 1 & 0 & 0 & 0 \\ 0 & \frac{e^{j\phi^h}}{\sqrt{3}} & 0 & 0 \\ 0 & 0 & 0 & \frac{1}{\sqrt{3}} \\ 0 & 0 & 0 & \frac{e^{j\theta^v}}{\sqrt{3}} \\ 0 & 0 & 1 & 0 \\ 0 & 0 & 0 & \frac{e^{j\phi^v}}{\sqrt{3}} \end{bmatrix}, \begin{bmatrix} 0 & \frac{1}{\sqrt{3}} & 0 & 0 \\ 0 & \frac{e^{j\theta^h}}{\sqrt{3}} & 0 & 0 \\ 0 & \frac{e^{j\phi^h}}{\sqrt{3}} & 0 & 0 \\ 1 & 0 & 0 & 0 \\ 0 & 0 & 0 & \frac{1}{\sqrt{3}} \\ 0 & 0 & 0 & \frac{e^{j\theta^v}}{\sqrt{3}} \\ 0 & 0 & 0 & \frac{e^{j\phi^v}}{\sqrt{3}} \\ 0 & 0 & 1 & 0 \end{bmatrix}, \right.$$

$$\left. \begin{bmatrix} \frac{1}{\sqrt{2}} & 0 & 0 & 0 \\ \frac{e^{j\theta^h}}{\sqrt{2}} & 0 & 0 & 0 \\ 0 & \frac{1}{\sqrt{2}} & 0 & 0 \\ 0 & \frac{e^{j\phi^h}}{\sqrt{2}} & 0 & 0 \\ 0 & 0 & \frac{1}{\sqrt{2}} & 0 \\ 0 & 0 & \frac{e^{j\theta^v}}{\sqrt{2}} & 0 \\ 0 & 0 & 0 & \frac{1}{\sqrt{2}} \\ 0 & 0 & 0 & \frac{e^{j\phi^v}}{\sqrt{2}} \end{bmatrix}, \begin{bmatrix} \frac{1}{\sqrt{2}} & 0 & 0 & 0 \\ 0 & \frac{1}{\sqrt{2}} & 0 & 0 \\ \frac{e^{j\theta^h}}{\sqrt{2}} & 0 & 0 & 0 \\ 0 & \frac{e^{j\phi^h}}{\sqrt{2}} & 0 & 0 \\ 0 & 0 & \frac{1}{\sqrt{2}} & 0 \\ 0 & 0 & 0 & \frac{1}{\sqrt{2}} \\ 0 & 0 & \frac{e^{j\theta^v}}{\sqrt{2}} & 0 \\ 0 & 0 & 0 & \frac{e^{j\phi^v}}{\sqrt{2}} \end{bmatrix}, \begin{bmatrix} \frac{1}{\sqrt{2}} & 0 & 0 & 0 \\ 0 & \frac{1}{\sqrt{2}} & 0 & 0 \\ 0 & \frac{e^{j\phi^h}}{\sqrt{2}} & 0 & 0 \\ \frac{e^{j\theta^h}}{\sqrt{2}} & 0 & 0 & 0 \\ 0 & 0 & \frac{1}{\sqrt{2}} & 0 \\ 0 & 0 & 0 & \frac{1}{\sqrt{2}} \\ 0 & 0 & 0 & \frac{e^{j\phi^v}}{\sqrt{2}} \\ 0 & 0 & \frac{e^{j\theta^v}}{\sqrt{2}} & 0 \end{bmatrix} \right\}.$$

The proposed performance metric in (5), i.e., principal singular value of the compressed beamspace matrix, is used to evaluate predefined compressing patterns for a given set of combining phases. In compressing patterns, each column represents the predefined unit norm channel compressing vector. Amplitude of coefficients in each column vector should be normalized to have a unit norm gain.

Figure 7:
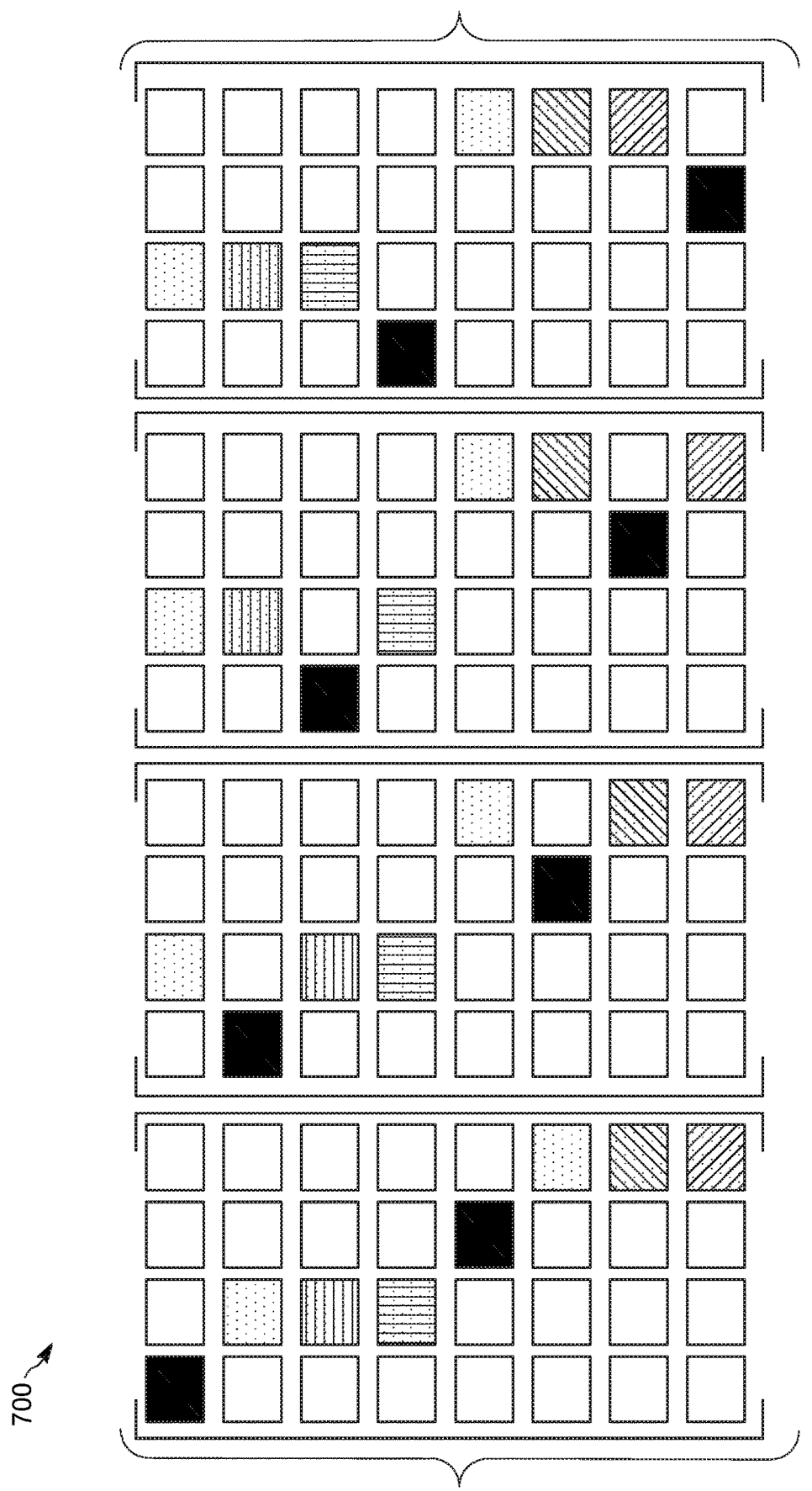
FIG. 7 is an exemplary 2-bit compressing pattern codebook in (13) for matrix design II—alt 0.
Figure 8:
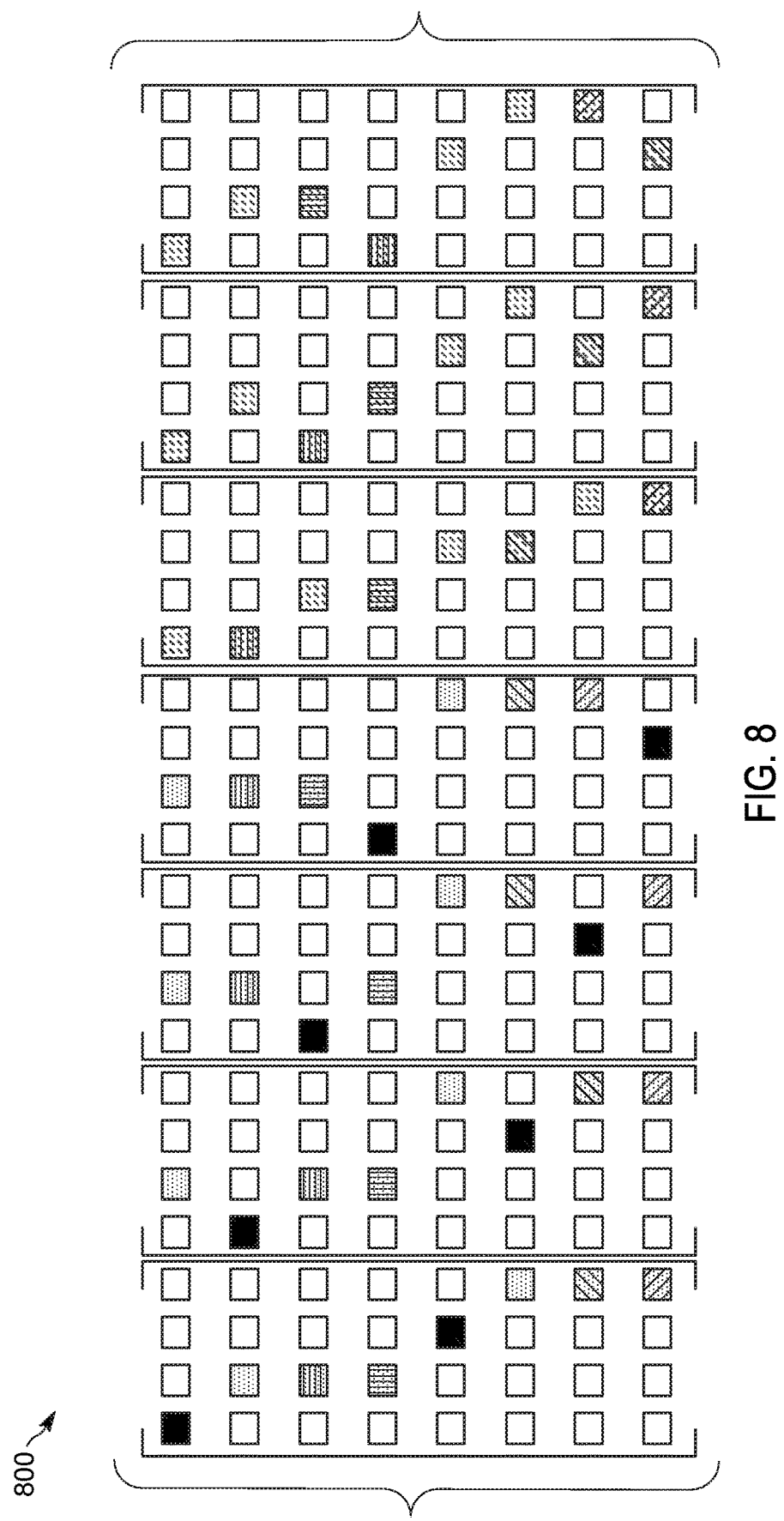
FIG. 8 is an exemplary 3-bit compressing pattern codebook in (14) for matrix design II—alt 0.

The 2-bit compressing pattern codebook 700 in (13) and 3-bit compressing pattern codebook 800 in (14) are depicted in FIG. 7 and FIG. 8, respectively. In the figures, each pattern in a first set of patterns represents an amplitude level and each pattern in a second set of patterns represents a phase. As depicted in the figures, amplitudes in each column are the same, while phases in each column are different.

C-2-2. Matrix Design II—Alt 1: Phase Alignment with Power Control

In the previous subsection, we did not consider power control between amplitude coefficients in compressing vector. Therefore, the amplitude of combining coefficients are set to have the same amplitude, i.e., $1/\sqrt{3}$ in (13) and $1/\sqrt{2}$ in (14). To increase system performances, we would consider different amplitude scaling factors based on the amplitude codebook in (10). The compression pattern codebooks in (13) and (14) are then rewritten as $$\mathcal{G}_2(\alpha_1^h, \alpha_2^h, \alpha_3^h, \alpha_1^v, \alpha_2^v, \alpha_3^v, \theta^h, \phi^h, \theta^v, \phi^v) = \quad (15)$$

$$\left\{ \begin{bmatrix} 1 & 0 & 0 & 0 \\ 0 & \frac{\alpha_1^h}{\sqrt{(\alpha_1^h)^2+(\alpha_2^h)^2+(\alpha_3^h)^2}} & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 0 & 0 & 1 & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 0 & \frac{\alpha_3^v e^{j\phi^v}}{\sqrt{(\alpha_1^v)^2+(\alpha_2^v)^2+(\alpha_3^v)^2}} \end{bmatrix}, \right.$$

$$\begin{bmatrix} 0 & \frac{\alpha_1^h}{\sqrt{(\alpha_1^h)^2+(\alpha_2^h)^2+(\alpha_3^h)^2}} & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 1 & 0 & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 1 & 0 \\ 0 & 0 & 0 & \frac{\alpha_3^v e^{j\phi^v}}{\sqrt{(\alpha_1^v)^2+(\alpha_2^v)^2+(\alpha_3^v)^2}} \end{bmatrix},$$

$$\begin{bmatrix} 0 & \frac{\alpha_1^h}{\sqrt{(\alpha_1^h)^2+(\alpha_2^h)^2+(\alpha_3^h)^2}} & 0 & 0 \\ 1 & 0 & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 0 & 0 & 1 & \frac{\alpha_1^v}{\sqrt{(\alpha_1^v)^2+(\alpha_2^v)^2+(\alpha_3^v)^2}} \\ 0 & 0 & 1 & 0 \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 0 & \frac{\alpha_3^v e^{j\phi^v}}{\sqrt{(\alpha_1^v)^2+(\alpha_2^v)^2+(\alpha_3^v)^2}} \end{bmatrix},$$

$$\left. \begin{bmatrix} 0 & \frac{\alpha_1^h}{\sqrt{(\alpha_1^h)^2+(\alpha_2^h)^2+(\alpha_3^h)^2}} & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 1 & 0 & 0 & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 0 & \frac{\alpha_3^v e^{j\phi^v}}{\sqrt{(\alpha_1^v)^2+(\alpha_2^v)^2+(\alpha_3^v)^2}} \\ 0 & 0 & 1 & 0 \end{bmatrix} \right\},$$

$$\mathcal{G}_3(\alpha_1^h, \ldots, \alpha_4^h, \alpha_1^v, \ldots, \alpha_4^v, \theta^h, \phi^h, \theta^v, \phi^v) = \quad (16)$$

$$\left\{ \begin{bmatrix} \frac{\alpha_4^h}{\alpha_4^h} & 0 & 0 & 0 \\ 0 & \frac{\alpha_1^h}{\sqrt{(\alpha_1^h)^2+(\alpha_2^h)^2+(\alpha_3^h)^2}} & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 0 & 0 & \frac{\alpha_4^v}{\alpha_4^v} & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 0 & \frac{\alpha_3^v e^{j\phi^v}}{\sqrt{(\alpha_1^v)^2+(\alpha_2^v)^2+(\alpha_3^v)^2}} \end{bmatrix}, \begin{bmatrix} 0 & \frac{\alpha_1^h}{\sqrt{(\alpha_1^h)^2+(\alpha_2^h)^2+(\alpha_3^h)^2}} & 0 & 0 \\ \frac{\alpha_4^h}{\alpha_4^h} & 0 & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & \frac{\alpha_4^v}{\alpha_4^v} & 0 \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 0 & \frac{\alpha_3^v e^{j\phi^v}}{\sqrt{(\alpha_1^v)^2+(\alpha_2^v)^2+(\alpha_3^v)^2}} \end{bmatrix}, \right.$$

$$\left. \begin{bmatrix} 0 & \frac{\alpha_1^h}{\sqrt{(\alpha_1^h)^2+(\alpha_2^h)^2+(\alpha_3^h)^2}} & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ \frac{\alpha_4^h}{\alpha_4^h} & 0 & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & \frac{\alpha_4^v}{\alpha_4^v} & 0 \\ 0 & 0 & 0 & \frac{\alpha_3^v e^{j\phi^v}}{\sqrt{(\alpha_1^v)^2+(\alpha_2^v)^2+(\alpha_3^v)^2}} \end{bmatrix}, \begin{bmatrix} 0 & \frac{\alpha_1^h}{\sqrt{(\alpha_1^h)^2+(\alpha_2^h)^2+(\alpha_3^h)^2}} & 0 & 0 \\ 0 & \frac{\alpha_2^h e^{j\theta^h}}{\sqrt{(\alpha_1^h)^2+(\alpha_2^h)^2+(\alpha_3^h)^2}} & 0 & 0 \\ 0 & \frac{\alpha_3^h e^{j\phi^h}}{\sqrt{(\alpha_1^h)^2+(\alpha_2^h)^2+(\alpha_3^h)^2}} & 0 & 0 \\ \frac{\alpha_4^h}{\alpha_4^h} & 0 & 0 & 0 \\ 0 & 0 & 0 & \frac{\alpha_1^v}{\sqrt{(\alpha_1^v)^2+(\alpha_2^v)^2+(\alpha_3^v)^2}} \\ 0 & 0 & 0 & \frac{\alpha_2^v e^{j\theta^v}}{\sqrt{(\alpha_1^v)^2+(\alpha_2^v)^2+(\alpha_3^v)^2}} \\ 0 & 0 & 0 & \frac{\alpha_3^v e^{j\phi^v}}{\sqrt{(\alpha_1^v)^2+(\alpha_2^v)^2+(\alpha_3^v)^2}} \\ 0 & 0 & \frac{\alpha_4^v}{\alpha_4^v} & 0 \end{bmatrix}, \right.$$

$$\begin{bmatrix} \frac{\alpha_1^h}{\sqrt{(\alpha_1^h)^2+(\alpha_2^h)^2}} & 0 & 0 & 0 \\ \frac{\alpha_2^h e^{j\theta^h}}{\sqrt{(\alpha_1^h)^2+(\alpha_2^h)^2}} & 0 & 0 & 0 \\ 0 & \frac{\alpha_3^h}{\sqrt{(\alpha_3^h)^2+(\alpha_4^h)^2}} & 0 & 0 \\ 0 & \frac{\alpha_4^h e^{j\phi^h}}{\sqrt{(\alpha_3^h)^2+(\alpha_4^h)^2}} & 0 & 0 \\ 0 & 0 & \frac{\alpha_1^v}{\sqrt{(\alpha_1^v)^2+(\alpha_2^v)^2}} & 0 \\ 0 & 0 & \frac{\alpha_2^v e^{j\theta^v}}{\sqrt{(\alpha_1^v)^2+(\alpha_2^v)^2}} & 0 \\ 0 & 0 & 0 & \frac{\alpha_3^v}{\sqrt{(\alpha_3^v)^2+(\alpha_4^v)^2}} \\ 0 & 0 & 0 & \frac{\alpha_4^v e^{j\phi^v}}{\sqrt{(\alpha_3^v)^2+(\alpha_4^v)^2}} \end{bmatrix},$$

$$\begin{bmatrix} \frac{\alpha_1^h}{\sqrt{(\alpha_1^h)^2+(\alpha_2^h)^2}} & 0 & 0 & 0 \\ 0 & \frac{\alpha_3^h}{\sqrt{(\alpha_3^h)^2+(\alpha_4^h)^2}} & 0 & 0 \\ \frac{\alpha_2^h e^{j\theta^h}}{\sqrt{(\alpha_1^h)^2+(\alpha_2^h)^2}} & 0 & 0 & 0 \\ 0 & \frac{\alpha_4^h e^{j\phi^h}}{\sqrt{(\alpha_3^h)^2+(\alpha_4^h)^2}} & 0 & 0 \\ 0 & 0 & \frac{\alpha_1^v}{\sqrt{(\alpha_1^v)^2+(\alpha_2^v)^2}} & 0 \\ 0 & 0 & 0 & \frac{\alpha_3^v}{\sqrt{(\alpha_3^v)^2+(\alpha_4^v)^2}} \\ 0 & 0 & \frac{\alpha_2^v e^{j\theta^v}}{\sqrt{(\alpha_1^v)^2+(\alpha_2^v)^2}} & 0 \\ 0 & 0 & 0 & \frac{\alpha_4^v e^{j\phi^v}}{\sqrt{(\alpha_3^v)^2+(\alpha_4^v)^2}} \end{bmatrix},$$

$$\begin{bmatrix} \frac{\alpha_1^h}{\sqrt{(\alpha_1^h)^2+(\alpha_2^h)^2}} & 0 & 0 & 0 \\ 0 & \frac{\alpha_3^h}{\sqrt{(\alpha_3^h)^2+(\alpha_4^h)^2}} & 0 & 0 \\ 0 & \frac{\alpha_4^h e^{j\phi^h}}{\sqrt{(\alpha_3^h)^2+(\alpha_4^h)^2}} & 0 & 0 \\ \frac{\alpha_2^h e^{j\theta^h}}{\sqrt{(\alpha_1^h)^2+(\alpha_2^h)^2}} & 0 & 0 & 0 \\ 0 & 0 & \frac{\alpha_1^v}{\sqrt{(\alpha_1^v)^2+(\alpha_2^v)^2}} & 0 \\ 0 & 0 & 0 & \frac{\alpha_3^v}{\sqrt{(\alpha_3^v)^2+(\alpha_4^v)^2}} \\ 0 & 0 & 0 & \frac{\alpha_4^v e^{j\phi^v}}{\sqrt{(\alpha_3^v)^2+(\alpha_4^v)^2}} \\ 0 & 0 & \frac{\alpha_2^v e^{j\theta^v}}{\sqrt{(\alpha_1^v)^2+(\alpha_2^v)^2}} & 0 \end{bmatrix}\Bigg\},$$

where $\alpha_1^h, \ldots, \alpha_4^h, \alpha_1^v, \ldots, \alpha_4^v \in \mathcal{Z}_B^{amp}$.

Figure 9:
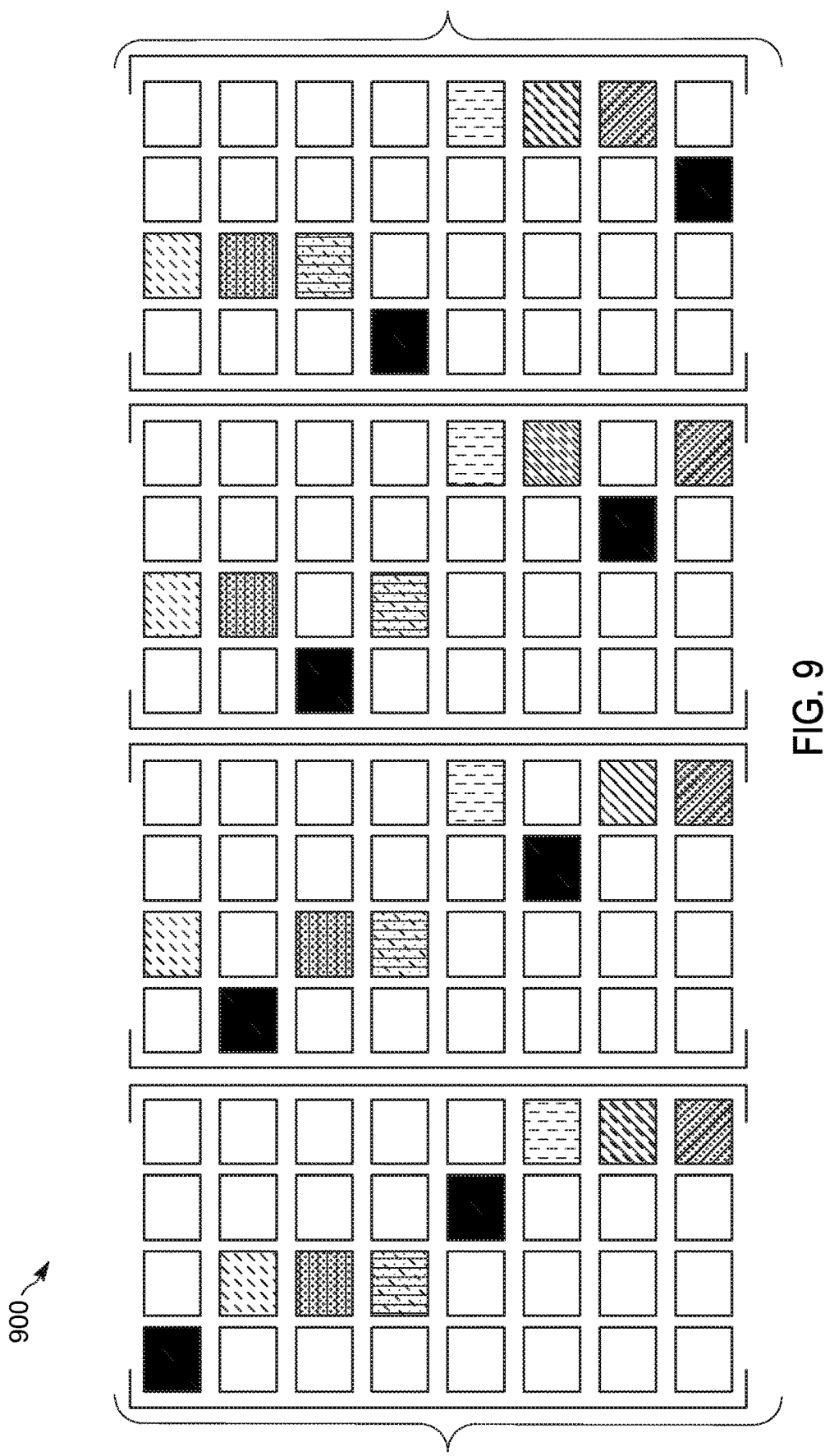
FIG. 9 is an exemplary 2-bit compressing pattern codebook in (15) for matrix design II—alt 1.
Figure 10:
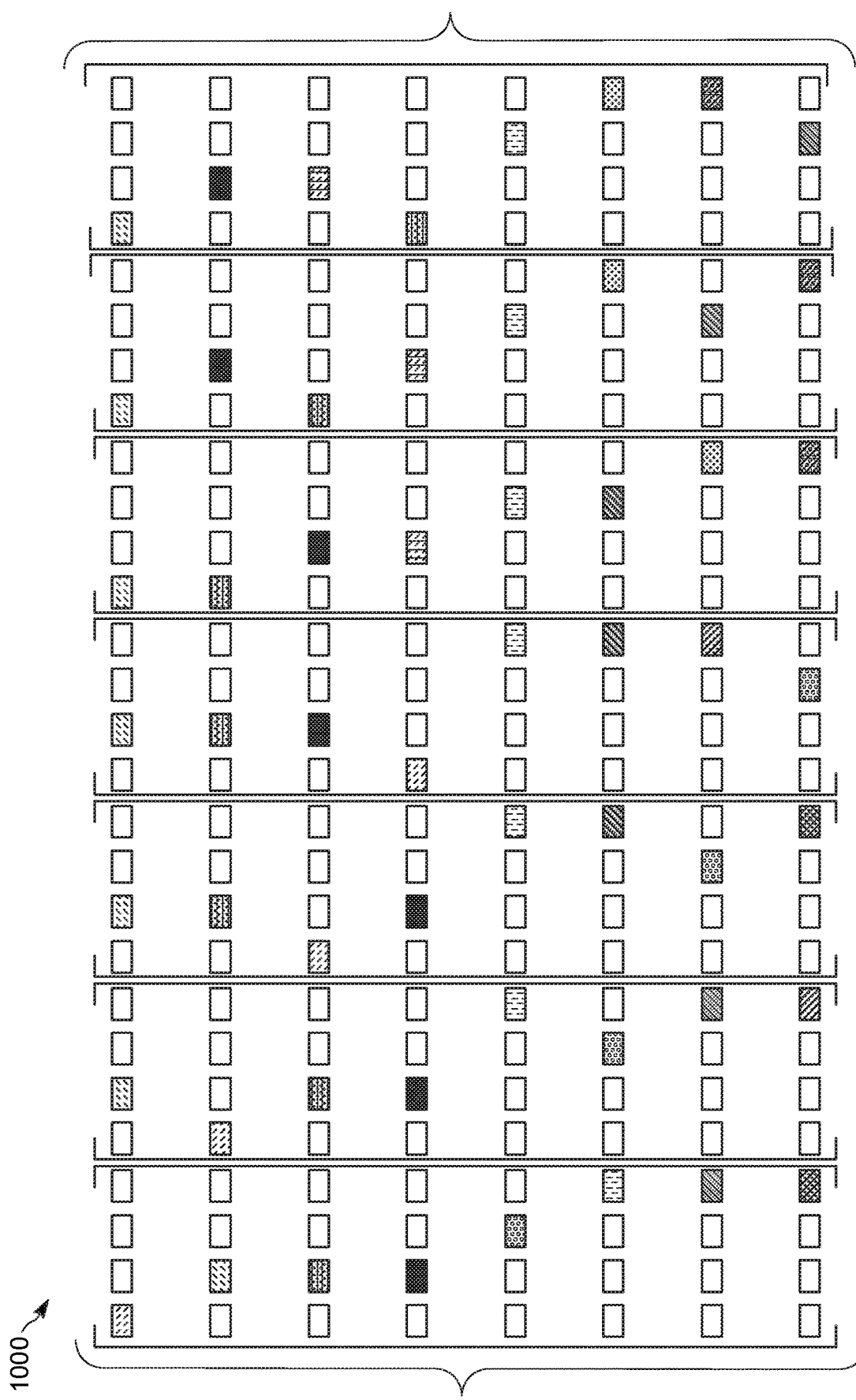
FIG. 10 is an exemplary 3-bit compressing pattern codebook in (16) for matrix design II—alt 1.

The 2-bit compressing pattern codebook 900 in (15) and 3-bit compressing pattern codebook 1000 in (16) are depicted in FIG. 9 and FIG. 10, respectively. In the figures, each pattern in a first set of patterns denotes amplitude of entry and each pattern in a second set of patterns pattern denotes the phase information. As depicted in the below figures, amplitudes and phases in each column are different.

In compressing patterns, each column represents the predefined unit norm channel compressing vector. Amplitude of coefficients in each column vector should be normalized to have a unit norm gain.

The compressing sub-matrix for each polarization is then chosen as $$G_r = G(\alpha_1^h, \ldots, \alpha_4^v, \theta^h, \phi^h, \theta^v, \phi^v),$$

$$= \underset{\tilde{G}(\tilde{\alpha}_1^h,\ldots,\tilde{\alpha}_4^v,\tilde{\theta}^h,\tilde{\phi}^h,\tilde{\theta}^v,\tilde{\phi}^v)\in \mathcal{G}_{B_{pat}}(\tilde{\alpha}_1^h,\ldots,\tilde{\alpha}_4^v,\tilde{\theta}^h,\tilde{\phi}^h,\tilde{\theta}^v,\tilde{\phi}^v)}{\operatorname{argmax}} \lambda_{max}(H_r^{BS}\tilde{G}(\tilde{\alpha}_1^h,\ldots,\tilde{\alpha}_4^v,\tilde{\theta}^h,\tilde{\phi}^h,\tilde{\theta}^v,\tilde{\phi}^v)),$$

where $\tilde{\theta}^h, \tilde{\phi}^h, \tilde{\theta}^v, \tilde{\phi}^v \in \mathcal{Z}_B^{phase}$ and $\tilde{\alpha}_1^h, \ldots, \tilde{\alpha}_4^v \in \mathcal{Z}_B^{amp}$.

C-3. Matrix Design III

In matrix design III, we assume that a compressing sub-matrix is polarization specific (i.e., a set of combining phases and a combining pattern are both polarization specific).

C-3-1. Matrix Design III—Alt 0: Phase alignment without power control

In this case, the compressing sub-matrices are chosen as $$G_r = \begin{bmatrix} A^h(\theta^h, \phi^h) & 0_{L\times L/2} \\ 0_{L\times L/2} & A^v(\theta^v, \phi^v) \end{bmatrix},$$

$$(A^h(\theta^h, \phi^h), A^v(\theta^v, \phi^v)) =$$

$$\underset{\tilde{A}^h(\tilde{\theta}^h,\tilde{\phi}^h)\in \mathcal{A}_{B_{pat}}(\tilde{\theta}^h,\tilde{\phi}^h), \tilde{A}^v(\tilde{\theta}^v,\tilde{\phi}^v)\in \mathcal{A}_{B_{pat}}(\tilde{\theta}^v,\tilde{\phi}^v)}{\operatorname{argmax}} \lambda_{max}\left(H_r^{BS}\begin{bmatrix} \tilde{A}^h(\tilde{\theta}^h, \tilde{\phi}^h) & 0_{L\times L/2} \\ 0_{L\times L/2} & \tilde{A}^v(\tilde{\theta}^v, \tilde{\phi}^v) \end{bmatrix}\right),$$

where $\tilde{\theta}^h, \tilde{\phi}^h, \tilde{\theta}^v, \tilde{\phi}^v \in \mathcal{Z}_B^{phase}$. Note that the compressing pattern codebooks are defined in (7) and (8) and the phase codebook is defined in (9).

C-3-2. Matrix Design III—Alt 1: Phase Alignment with Power Control

In this case, the compressing sub-matrices are chosen as $$G_r = \begin{bmatrix} A^h(\alpha_1^h,\ldots,\alpha_4^h,\theta^h,\phi^h) & 0_{L\times L/2} \\ 0_{L\times L/2} & A^v(\alpha_1^v,\ldots,\alpha_4^v,\theta^v,\phi^v) \end{bmatrix},$$

$$(A^h(\alpha_1^h,\ldots,\alpha_4^h,\theta^h,\phi^h), A^v(\alpha_1^v,\ldots,\alpha_4^v,\theta^v,\phi^v)) =$$

$$\underset{\tilde{A}^h(\tilde{\alpha}_1^h,\ldots,\tilde{\alpha}_4^h,\tilde{\theta}^h,\tilde{\phi}^h)\in \mathcal{A}_{B_{pat}}(\tilde{\alpha}_1^h,\ldots,\tilde{\alpha}_4^h,\tilde{\theta}^h,\tilde{\phi}^h),\, \tilde{A}^v(\tilde{\alpha}_1^v,\ldots,\tilde{\alpha}_4^v,\tilde{\theta}^v,\tilde{\phi}^v)\in \mathcal{A}_{B_{pat}}(\tilde{\alpha}_1^v,\ldots,\tilde{\alpha}_4^v,\tilde{\theta}^v,\tilde{\phi}^v)}{\operatorname{argmax}} \lambda_{max}\left(H_r^{BS}\begin{bmatrix} \tilde{A}^h(\tilde{\alpha}_1^h,\ldots,\tilde{\alpha}_4^h,\tilde{\theta}^h,\tilde{\phi}^h) & 0_{L\times L/2} \\ 0_{L\times L/2} & \tilde{A}^v(\tilde{\alpha}_1^v,\ldots,\tilde{\alpha}_4^v,\tilde{\theta}^v,\tilde{\phi}^v) \end{bmatrix}\right),$$

where $\tilde{\theta}^h, \tilde{\phi}^h, \tilde{\theta}^v, \tilde{\phi}^v \in \mathcal{Z}_B^{phase}$ and $\tilde{\alpha}_1^h, \ldots, \tilde{\alpha}_4^h, \tilde{\alpha}_1^v, \ldots, \tilde{\alpha}_4^v \in \mathcal{Z}_B^{amp}$. The compressing pattern codebooks are defined in (11) and (12) and the phase codebook is defined in (9).

---

Algorithm 1
Compute WB PMI based on proposed WB quantizer

---

*Initialization*

1: Initialize beamspace matrix $H_1^{BS} = H(I_2 \otimes B) \in \mathbb{C}^{2N_{rx}W \times 2L}$

*Iterative update*

2: for $1 \leq r \leq R$
3: Compute target basis combining vector for a given $G_r \in \mathbb{C}^{2L \times L}$
$\quad w_{r,opt} = \operatorname{argmax}_{\tilde{w}\in\mathbb{C}^L} \|H_r^{BS} G_r \tilde{w}\|_2^2 = v_{max}(H_r^{BS} G_r) \in \mathbb{C}^L$ -continued Algorithm 1
Compute WB PMI based on proposed WB quantizer 4: Quantize amplitudes $p_r = \text{argmax}_{\tilde{p} \in C_{amp}^{\tilde{L}}} \left| \frac{\tilde{p}^H |w_{r,opt}|}{\|\tilde{p}\|_2} \right|^2 \in \mathbb{R}^{\tilde{L}}$ 5: Compute quantized basis combining vector $w_r = p_r \odot e^{j\angle w_{r,opt}} \in \mathbb{C}^{\tilde{L}}$ 6: Compute expanded basis combining vector $v_r = \frac{G_r w_r}{\|G_r w_r\|_2} \in \mathbb{C}^{2L}$ 7: Update beamspace matrix $H_{r+1}^{BS} = H_r^{BS}(I_{2L} - v_r^H v_r) \in \mathbb{C}^{2N_{rx}W \times 2L}$
8: end for UE reports WB PMI 9: Set of selected beams $B = [b_1, \ldots, b_L] \in \mathbb{C}^{N_{tx} \times L}$
10: Index of strongest coefficient out of 2L coefficients
11: Set of quantized amplitudes $\{p_1, \ldots, p_R\} \in \mathbb{R}^{\tilde{L} \times R}$
12: Set of compression matrices $\{G_1, \ldots, G_R\} \in \mathbb{R}^{2L \times \tilde{L} \times R}$ Wideband and Subband Quantizers In this section, we develop WB and SB quantizers based on the proposed channel compressing algorithms. Both WB and SB quantizers are designed to work in conjunction with or without the agreed Type II CSI codebook in R1-1709232, "WF on Type I and II CSI codebooks". In the dual-codebook architecture, WB PMI and SB PMI are computed sequentially so that we present WB and SB quantizer in each sub-section.

A. Proposed WB Quantizer

In this section, we compute WB PMI based on the proposed channel compressing algorithm having a quantization procedure, which is summarized in Algorithm 1. After compressing beamspace matrix with the selected compressing matrix $G_r$, WB quantizer computes a $\tilde{L}$-dimensional basis combining vector, while the Type II codebook computes a 2L-dimensional basis combing vector.

The $\tilde{L}$-dominant target combining vector are quantized based on the vector quantization technique in R1-1709232, "WF on Type I and II CSI codebooks". Note that details are reviewed as follows. To quantize amplitudes of the target combining vector, we first select the strongest amplitude out of $\tilde{L}$ entries in $w_{r,opt}$. The selected amplitude will be amplitude reference, where before normalizing quantized amplitudes, the reference amplitude is assumed to be one. The remaining $\tilde{L}-1$ amplitudes are then quantized by using the 3-bits amplitude codebook $\mathcal{Z}_3^{amp}$ in (10). The quantized amplitude scaling factors $p_r$, in line 4 of Algorithm 1, are normalized to have a unit norm gain.

To update a beamspace matrix for following quantization rounds, a basis combining vector is quantized and expanded as summarized in lines 5 and 6 of Algorithm 1. The expanded r-th combining vector $v_r \in \mathbb{C}^{2L}$, in line 6 of Algorithm 1, is projected out from the r-th beamspace matrix $H_r^{BS}$ to update a beamspace matrix $H_{r+1}^{BS}$. The updated beamspace matrix is then used to compute the (r+1)-th combining vector. In an iterative fashion, we construct a set of quantized amplitudes as shown in line 11 of Algorithm 2, shown below.

Algorithm 2
Compute SB PMI based on proposed SB quantizer

Initialization

1: In each SB, initialize beamspace matrix $H_1^{BS}[s] = H[s](I \otimes B) \in \mathbb{C}^{2N_{rx}W/S \times 2L}$ Iterative update 2: for $1 \le r \le R$
3: Compute target basis combining vector for a given $G_r \in \mathbb{C}^{2L \times \tilde{L}}$
$w_{r,opt}[s] = \text{argmax}_{\tilde{w} \in \mathbb{C}^{\tilde{L}}} \|H_r^{BS}[s]G_r \tilde{w}\|_2^2 = v_{max}(H_r^{BS}[s]G_r) \in \mathbb{C}^{\tilde{L}}$
4: Quantize phases $\theta_r[s] = \text{argmin}_{\tilde{\theta} \in C_{phase}^{+E,OTL\ L+EE}} \|\theta - \angle w_{r,opt}[s]\|_2^2 \in [0, 2\pi)^{\tilde{L}}$ 5: Quantize amplitudes $p_r[s] = \text{argmax}_{\tilde{p} \in C_{amp}^{\tilde{L}}} \left| \frac{w_{r,opt}^H[s](\tilde{p} \odot p_r \odot e^{j\theta_r[s]})}{\|\tilde{p} \odot p_r \odot e^{j\theta_r^{SB}[s]}\|_2} \right|^2 \in \mathbb{R}^{\tilde{L}}$ 6: Compute quantized basis combining vector $w_r[s] \, p_r[s] \odot p_r \odot e^{j\angle\theta_r[s]} \in \mathbb{C}^{\tilde{L}}$ 7: Compute expanded basis combining vector $v_r[s] = \frac{G_r w_r[s]}{\|G_r w_r[s]\|_2} \in \mathbb{C}^{2L}$ 8: Update beamspace matrix $H_{r+1}^{BS}[s] = H_r^{BS}[s](I_{2L} - v_r^H[s]v_r[s]) \in \mathbb{C}^{2N_{rx}W/S \times 2L}$
9: end for UE reports SB PMI 10: Set of quantized phases $\{\theta_1[s], \ldots, \theta_R[s]\} \in [0, 2\pi)^{\tilde{L} \times R}$
11: Set of quantized amplitudes $\{p_1[s], \ldots, p_R[s]\} \in \mathbb{R}^{\tilde{L} \times R}$ -continued Algorithm 2
Compute SB PMI based on proposed SB quantizer Final update 12: Compute beamforming vector $f_r[s] = (I_2 \otimes B)v_r[s] \in \mathbb{C}^{2N_{tx}}$
13: Compute precoding matrix $F[s] = [f_1[s], \ldots, f_R[s]]/\sqrt{R} \in \mathbb{C}^{2N_{tx} \times R}$ B. Proposed SB Quantizer We next compute SB PMI based on the proposed channel compressing algorithm, where the quantization procedure is summarized in Algorithm 2. Based on the vector quantization technique in R1-1709232, "WF on Type I and II CSI codebooks", the phase of the selected strongest amplitude will be phase reference, where the reference phase is assumed to be zero, and remaining $\hat{L}-1$ phases are quantized using the 3-bits phase codebook $Z_3^{phase}$ in (9). In line 5 of Algorithm 2, we next compute the SB amplitude scaling vector to increase resolutions of the quantized amplitudes $p_r$. Amplitudes of the target combing vector in each SB is quantized using the 1-bit amplitude codebook $Z_1^{amp}$ in (10) and the pre-quantized amplitude vector $p_r$ in WB PMI.

To update a beamspace matrix for following rounds, a combining vector is quantized and expanded as shown in lines 6 and 7 of Algorithm 2. The expanded r-th combining vector $v_r[s] \in \mathbb{C}^{2L}$, in line 7 of Algorithm 2, is projected out from the r-th beamspace matrix $H_r^{BS}[s]$. The updated beamspace matrix $H_{r+1}^{BS}[s]$ is then used to compute the (r+1)-th basis combining vector. In an iterative fashion, we construct a set of quantized phases and a set of quantized amplitudes, as shown in lines 10 and 11 of Algorithm 2.

Based on WB and SB PMI, a transmitter computes a beamforming vector for each transmission layer, in line 12 of Algorithm 2. Note that the proposed WB and SB quantizers would be operated in conjunction with/without the Type II CSI codebook in R1-1709232, "WF on Type I and II CSI codebooks". For example, if rank 1-2 beamformers are computed based on the Type II codebook and rank 3-4 beamformers are computed based on the proposed quantizer, an iterative update in line 2 of Algorithm 1 and 2 should be rewritten as $3 \leq r \leq R$.

TABLE 1

CSI codebooks for system level simulations

| Codebook 1 | Type II codebook in [1] for rank 1-4 |
| Codebook 2 | Type II for rank 1-2 & codebook in [3] for rank 3-4 |
| Codebook I-a | Type II for rank 1-2 & proposed codebook based on matrix design I - Alt 0 for rank 3-4 |
| Codebook II-a | Type II for rank 1-2 & proposed codebook based on matrix design II - Alt 0 for rank 3-4 |
| Codebook I-b | Proposed codebook based on matrix design I - Alt 0 for Rank 1-4 |
| Codebook II-b | Proposed codebook based on matrix design II - Alt 0 for Rank 1-4 |

Numerical Simulations

We evaluate data rate performance (bits/s/Hz/user) of the proposed quantizers. We evaluate CSI codebooks summarized in Table 1. The CSI codebook 1 is designed based on the Type II codebook in R1-1709232, "WF on Type I and II CSI codebooks", and the CSI codebook 2 is developed based on the codebook in R1-1710674, "On higher rank (rank 3 and 4) Type II CSI". The CSI codebooks I and II are developed based on the matrix designs I and II, respectively. In the quantization scheme a, rank 1-2 beamformers are computed based on the Type II codebook in R1-1709232, "WF on Type I and II CSI codebooks", and rank 3-4 beamformers are computed based on the channel compressing algorithms in the Channel Matrix Compressing Algorithm section and the proposed quantizer in the Wideband and Subband Quantizers section. In the quantization scheme b, all of the rank 1-4 beamformers are computed based on the proposed algorithms to reduce more feedback overhead, where the total feedback overhead required for each codebook is summarized below. Simulation results are obtained through system level simulations with 10,000 TTIs and 40 drops. For system level simulations, where the rest of simulation parameters are summarized in below, we consider 3D UMi scenario, 32 port (4, 4, 2) antenna configurations, and a non-full buffer traffic scenario with a parameter $\lambda_{traffic}=2$ and $\lambda_{traffic}=3.5$.

Figure 11:
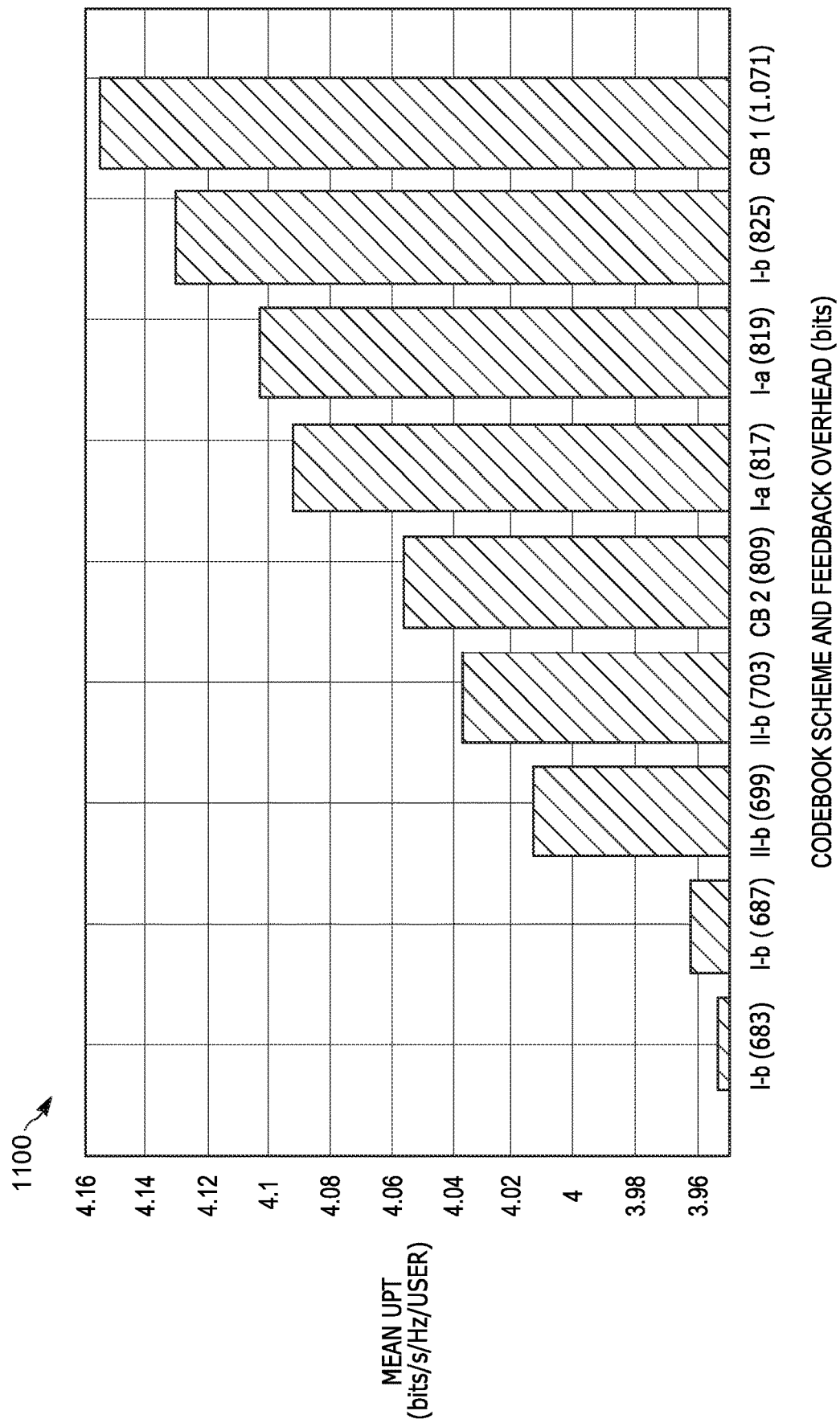
FIG. 11 is a graph illustrating an exemplary mean throughput performance of channel state information (CSI) codebooks (CBs) for $\lambda_{traffic}=3.5$.
Figure 12:
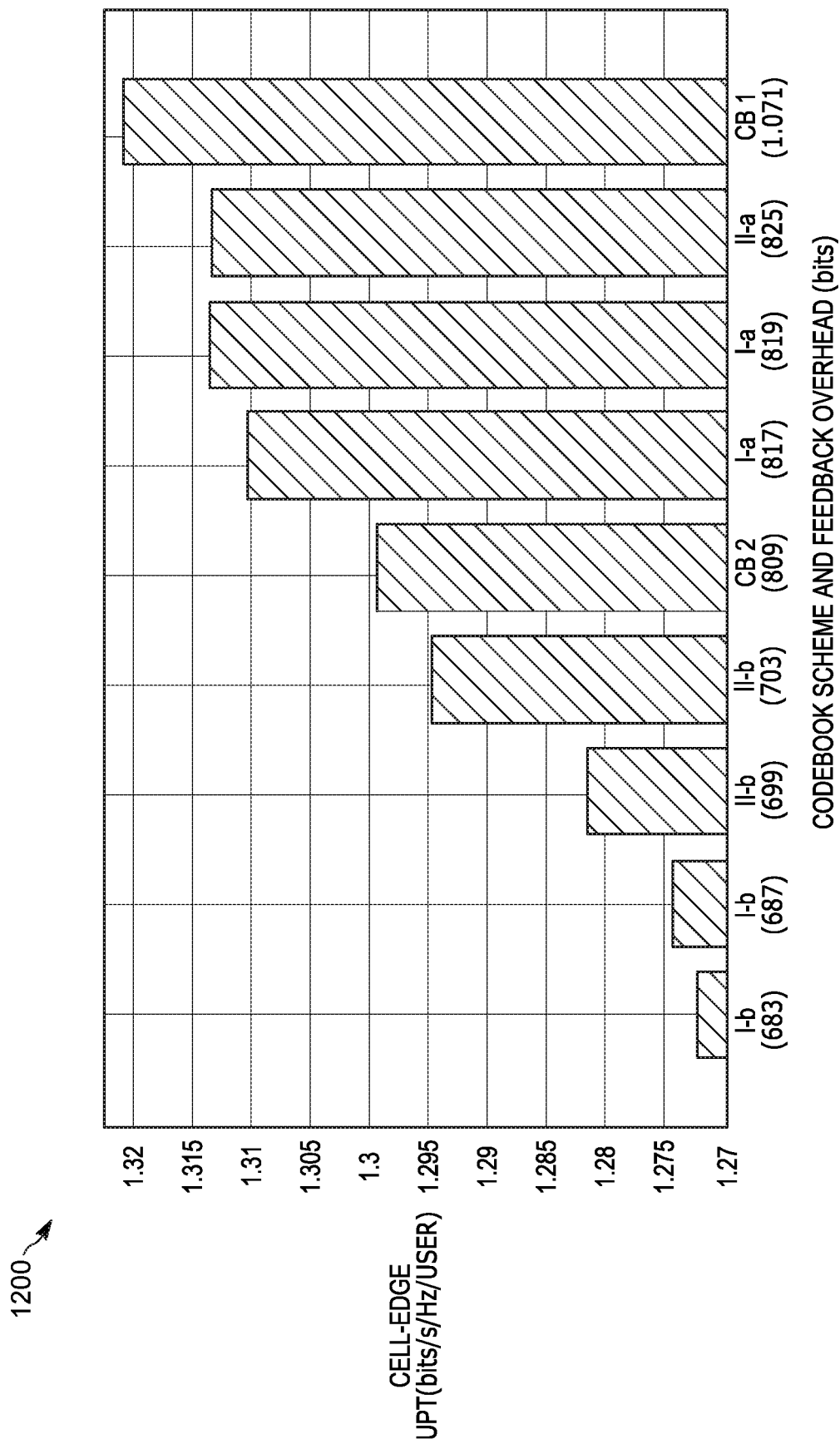
FIG. 12 is a graph illustrating an exemplary cell-edge throughput performance of channel state information (CSI) codebooks (CBs) for $\lambda_{traffic}=3.5$.
Figure 13:
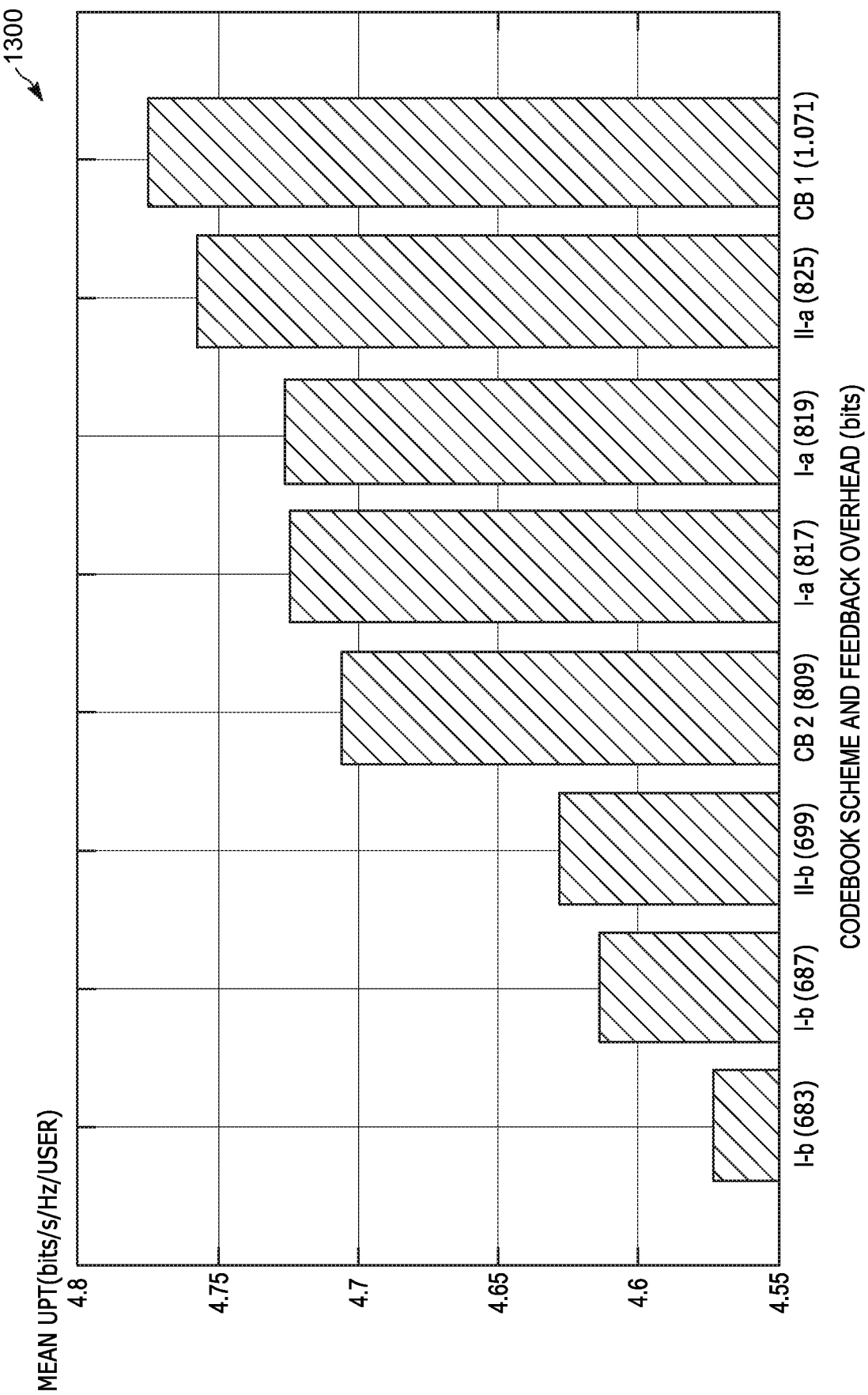
FIG. 13 is a graph illustrating an exemplary mean throughput performance of channel state information (CSI) codebooks (CBs) for $\lambda_{traffic}=2$.
Figure 14:
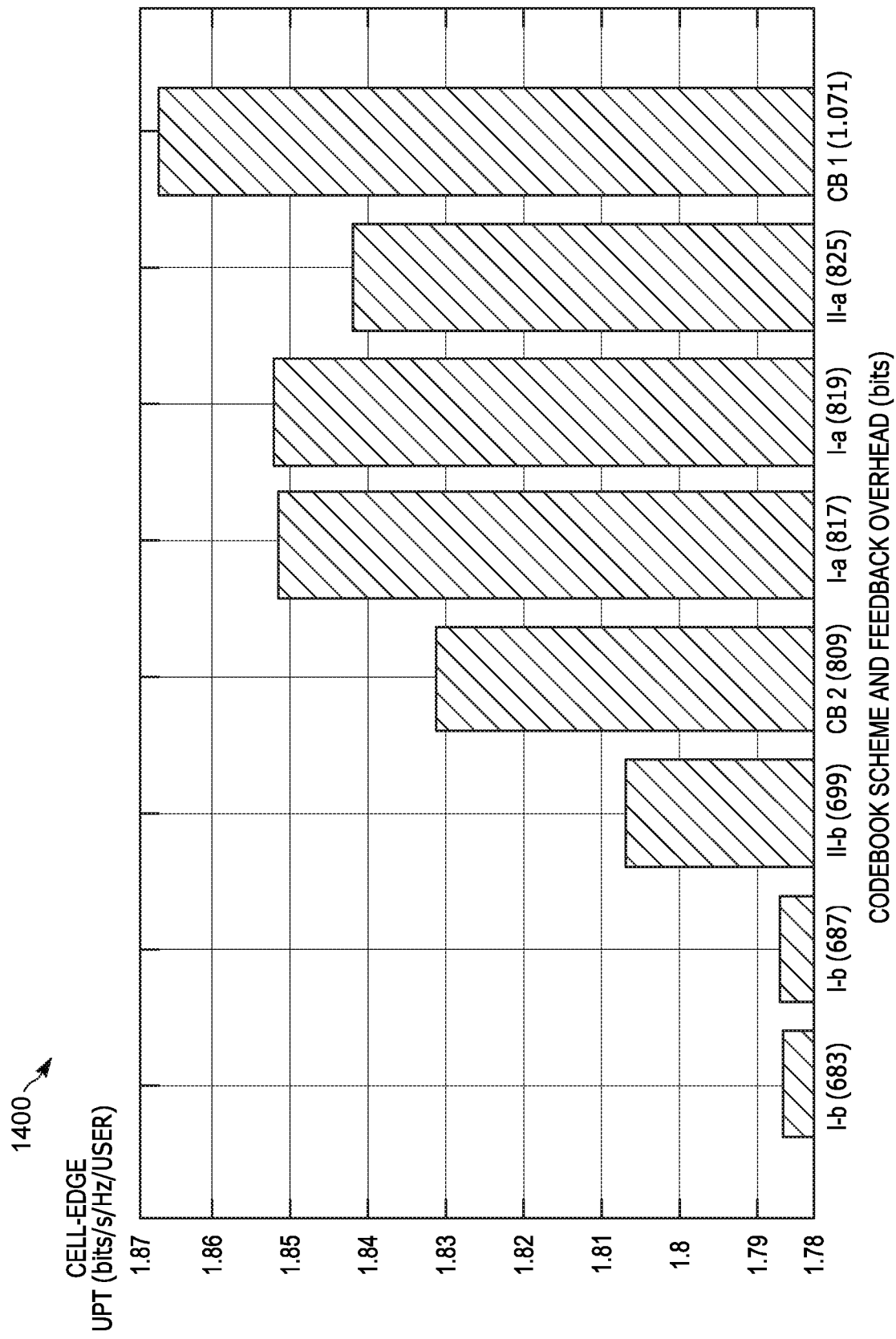
FIG. 14 is a graph illustrating an exemplary cell-edge throughput performance of channel state information (CSI) codebooks (CBs) for $\lambda_{traffic}=2$.

The 5% cell edge and mean throughput of codebooks are presented below in Table 2, with a parameter $\lambda_{traffic}=3.5$. The results are also depicted in FIG. 11 and FIG. 12, which respectively illustrate a mean throughput performance 1100 of CSI codebooks and cell-edge throughput performance 1200 of CSI codebooks for ($\lambda_{traffic}=3.5$). Note that codebooks in the x-axis are organized in an ascending order of total feedback overhead. The codebook 1 gives enhanced data-rate performances, while this approach involves a large total feedback overhead. In the proposed codebooks I and II, the reduced L-dimensional column vectors are quantized in each SB. On the contrary, the 2L-dimensional column vectors need to be quantized in the codebook 1. For these reason, the codebook 1 has an outlay of large feedback overhead, when compared to the proposed codebooks I and II. The corresponding results for $\lambda_{traffic}=2.0$ are depicted in FIG. 13 and FIG. 14.

As shown in Table 2, the proposed codebooks reduce total feedback overhead and also maintain data-rate performances compared to the codebook 1. The codebooks I-a and II-a obtain 22.969~23.716% feedback overhead reductions with mean throughput degradations of 0.627~1.538% and cell-edge throughput degradations of 0.546~0.789%. In addition, the codebooks I-b and II-b obtain 34.74~36.228% feedback overhead reductions with mean throughput degradations of 2.855~4.934% and cell-edge throughput degradations of 1.964~3.649%. The proposed codebooks I give better data-rate performances than the codebook 2 in R1-1710674, "On higher rank (rank 3 and 4) Type II CSI", while the feedback overhead has increased slightly.

TABLE 2

Data rate performance of CSI codebooks ($\lambda_{traffic} = 3.5$)

| | CSI codebook type | 5% cell edge (bits/s/Hz/user) | Mean throughput (bits/s/Hz/user) | Feedback overhead (bits) |
|---|---|---|---|---|
| Codebook 1 | Reference codebook | 1.3207 (0%) | 4.156 (0%) | 1071 (0%) |
| Codebook 2 | 2-bits for beam selection | 1.2995 (−1.6074%) | 4.0563 (−2.4574%) | 809 (−24.4631%) |
| Codebook I-a | 2 - bits $\mathcal{P}_{2|\theta, \phi}$ & 2 - bits $\mathcal{Z}_2$ (2-bits pattern CB & two 2-bits phase CBs) | 1.3103 (−0.789%) | 4.0921 (−1.538%) | 817 (−23.7162%) |
| | 3 - bits $\mathcal{P}_{3|\theta, \phi}$ & 2 bits $\mathcal{Z}_2$ (3-bits pattern CB & two 2-bits phase CBs) | 1.3135 (−0.5459%) | 4.1027 (−1.2834%) | 819 (−23.5294%) |
| Codebook II-a | 2 - bits $Q_{2|\theta^h, \phi^h, \theta^v, \phi^v}$ & 2 - bits $\mathcal{Z}_2$ (2-bits pattern CB & four 2-bits phase CBs) | 1.3135 (−0.5505%) | 4.13 (−0.6266%) | 825 (−22.9692%) |
| Codebook I-b | 2 - bits $\mathcal{P}_{2|\theta, \phi}$ & 2 - bits $\mathcal{Z}_2$ (3-bits pattern CB & two 3-bits phase CBs) | 1.2725 (−3.6487%) | 3.951 (−4.9336%) | 683 (−36.2278%) |
| | 3 - bits $\mathcal{P}_{3|\theta, \phi}$ & 2 bits $\mathcal{Z}_2$ (3-bits pattern CB & two 3-bits phase CBs) | 1.2746 (−3.495%) | 3.9618 (−4.6718%) | 687 (−35.8543%) |
| Codebook II-b | 2 - bits $Q_{2|\theta^h, \phi^h, \theta^v, \phi^v}$ & 2 - bits $\mathcal{Z}_2$ (2-bits pattern CB & four 2-bits phase CBs) | 1.2818 (−2.9514%) | 4.0137 (−3.4244%) | 699 (−34.7399%) |
| | 3 - bits $Q_{3|\theta^h, \phi^h, \theta^v, \phi^v}$ & 2 - bits $\mathcal{Z}_2$ (3-bits pattern CB & four 2-bits phase CBs) | 1.2948 (−1.9641%) | 4.0373 (−2.8551%) | 703 (−34.3604%) |

TABLE 3

Data rate performance of CSI codebooks ($\lambda_{traffic} = 2$)

| | CSI codebook type | 5% cell edge (bits/s/Hz/user) | Mean throughput (bits/s/Hz/user) | Feedback overhead (bits) |
|---|---|---|---|---|
| Codebook 1 | Reference codebook | 1.8675 (0%) | 4.7736 (0%) | 1071 (0%) |
| Codebook 2 | 2-bits for beam selection | 1.8302 (−1.4729%) | 4.7058 (−1.4197%) | 809 (−24.4631%) |
| Codebook I-a | 2 - bits $\mathcal{F}_{2|\theta, \phi}$ & 2 - bits $\mathcal{Z}_2$ (2-bits pattern CB & two 2-bits phase CBs) | 1.8515 (−0.3252%) | 4.7251 (−1.0164%) | 817 (−23.7162%) |
| | 3 - bits $\mathcal{F}_{3|\theta, \phi}$ & 2 bits $\mathcal{Z}_2$ (3-bits pattern CB & two 2-bits phase CBs) | 1.8521 (−0.3252%) | 4.7261 (−0.9955%) | 819 (−23.5294%) |
| Codebook II-a | 2 - bits $Q_{2|\theta^h, \phi^h, \theta^v, \phi^v}$ & 2 - bits $\mathcal{Z}_2$ (2-bits pattern CB & four 2-bits phase CBs) | 1.8415 (−0.8646%) | 4.758 (−0.3264%) | 825 (−22.9692%) |
| Codebook I-b | 2 - bits $\mathcal{F}_{2|\theta, \phi}$ & 2 - bits $\mathcal{Z}_2$ (3-bits pattern CB & two 3-bits phase CBs) | 1.7839 (−3.9617%) | 4.574 (−4.1807%) | 683 (−36.2278%) |
| | 3 - bits $\mathcal{F}_{3|\theta, \phi}$ & 2 bits $\mathcal{Z}_2$ (3-bits pattern CB & two 2-bits phase CBs) | 1.7845 (−3.9321%) | 4.6143 (−4.1807%) | 687 (−35.8543%) |
| Codebook II-b | 2 - bits $Q_{2|\theta^h, \phi^h, \theta^v, \phi^v}$ & 2 - bits $\mathcal{Z}_2$ (2-bits pattern CB & four 2-bits phase CBs) | 1.8048 (−1.28382%) | 4.6278 (−3.0539%) | 699 (−34.7399%) |

Conclusions

In this disclosure, we developed a higher resolution CSI codebook which is suitable for higher rank transmission. First, a channel compressing algorithm is proposed to reduce feedback overhead. Based on empirical studies, compressing matrix design algorithms are proposed to support the channel compressing algorithm. Second, we developed WB and SB quantizers that are suitable for the proposed channel compressing algorithm. The quantizers are developed to work in conjunction with/without the agreed Type II CSI codebook. System level simulations verified that the proposed channel compressing algorithm provides higher data rates than previous CSI codebooks. The proposed CSI codebooks maintained data-rate performance, while the codebooks exploited less feedback overhead compared to the rank 1-4 Type II CSI codebook.

Feedback Overhead Calculations

In this section, feedback overhead of CSI codebooks in Table 1 are calculated. We assume L=4 beam selection, R=4 maximum layer transmission, and S=10 SBs.

A-1. Codebook 1

We first discuss feedback overhead of the codebook 1. The feedback overhead is summarized in Table 4.

TABLE 4

Feedback overhead comparison of codebook 1

| Feedback overhead | WB | | | | SB | |
| --- | --- | --- | --- | --- | --- | --- |
| | Layer common | | Layer specific | | | |
| | Oversampling | L Beam selection | Strongest beam | WB amplitude | SB amplitude | SB phase |
| Layer 1 | 4 | 11 | 3 | 21 | 5S | 19S |
| Layer 2 | | | 3 | 21 | 5S | 19S |
| Layer 3 | | | 3 | 21 | 5S | 19S |
| Layer 4 | | | 3 | 21 | 5S | 19S |
| Total R Layers | 4 | 11 | 3R | 21R | 5RS | 19RS |

The total feedback overhead required for rank 1-4 transmissions is calculated as $$B_{Codebook\ 1}^{tot} = 15 + 24R + 24RS = 1071 \text{ (bits)}.$$

A-2. Codebook 2

We next discuss feedback overhead of the codebook 2. The feedback overhead is summarized in Table 5.

TABLE 5

Feedback overhead comparison of codebook 2

| Feedback overhead | WB | | | | | SB | |
| --- | --- | --- | --- | --- | --- | --- | --- |
| | Layer common | | Layer specific | | | | |
| | Oversampling | L Beam selection | 2 Beam selection | Strongest beam | WB amplitude | SB amplitude | SB phase |
| Layer 1 | 4 | 11 | NA | 3 | 21 | 5S | 19S |
| Layer 2 | | | NA | 3 | 21 | 5S | 19S |
| Layer 3 | | | 2 | 2 | 9 | 3S | 19S |
| Layer 4 | | | 2 | 2 | 9 | 3S | 9S |
| Total R Layers | 4 | 11 | R | 2.5R | 15R | 4RS | 14RS |

The total feedback overhead required for rank 1-4 transmissions is calculated as $$B_{Codebook\ 2}^{tot} = 15 + 18.5R + 18RS = 809 \text{ (bits)}.$$

A-3. Codebook I

We now discuss feedback overhead of our proposed CSI codebooks. The feedback overhead of codebooks I (which are designed based on matrix design I) are summarized in Table 6 and 7.

TABLE 6

Feedback overhead comparison of codebook I-a.

| Feedback overhead | WB | | | | | | SB | |
| --- | --- | --- | --- | --- | --- | --- | --- | --- |
| | Layer common | | Layer specific | | | | | |
| | Oversampling | L Beam selection | Pattern | Cophasing | Strongest beam | WB amp | SB amp | SB phase |
| Layer 1 | 4 | 11 | NA | NA | 3 | 21 | 5S | 19S |
| Layer 2 | | | NA | NA | 3 | 21 | 5S | 19S |
| Layer 3 | | | 2 | 4 | 2 | 9 | 3S | 9S |
| Layer 4 | | | 2 | 4 | 2 | 9 | 3S | 9S |
| Total R Layers | 4 | 11 | R | 2R | 2.5R | 15R | 4RS | 14RS |

TABLE 7

Feedback overhead comparison of codebook I-b.

| Feedback overhead | WB | | | | | | | SB |
|---|---|---|---|---|---|---|---|---|
| | Layer common | | Layer specific | | | | | |
| | Oversampling | L Beam selection | Pattern | Cophasing | Strongest beam | WB amp | SB amp | SB phase |
| Layer 1 | 4 | 11 | 2/3 | 4 | 2 | 9 | 3S | 9S |
| Layer 2 | | | 2/3 | 4 | 2 | 9 | 3S | 9S |
| Layer 3 | | | 2/3 | 4 | 2 | 9 | 3S | 9S |
| Layer 4 | | | 2/3 | 4 | 2 | 9 | 3S | 9S |
| Total R Layers | 4 | 11 | 2R/3R | 4R | 2R | 9R | 3RS | 12RS |

In both phase codebook scenarios (i.e. 2 bit/3 bit phase codebooks in WB), the total feedback overhead required for rank 1-4 transmissions are calculated as $B_{Codebook\ I-a}^{tot}=15+20.5/21R+18RS=817/819$ (bits), $B_{Codebook\ I-b}^{tot}=15+17/18R+15RS=683/687$ (bits).

A-4. Codebook II

The feedback overhead of the codebooks I (which are designed based on matrix design II) are summarized in Table 8 and 9.

TABLE 8

Feedback overhead comparison of codebook II-a.

| Feedback overhead | WB | | | | | | | SB |
|---|---|---|---|---|---|---|---|---|
| | Layer common | | Layer specific | | | | | |
| | Oversampling | L Beam selection | Pattern | Cophasing | Strongest beam | WB amp | SB amp | SB phase |
| Layer 1 | 4 | 11 | NA | NA | 3 | 21 | 5S | 19S |
| Layer 2 | | | NA | NA | 3 | 21 | 5S | 19S |
| Layer 3 | | | 2 | 8 | 2 | 9 | 3S | 9S |
| Layer 4 | | | 2 | 8 | 2 | 9 | 3S | 9S |
| Total R Layers | 4 | 11 | R | 4R | 2.5R | 15R | 4RS | 14RS |

TABLE 9

Feedback overhead comparison of codebook II-b.

| Feedback overhead | WB | | | | | | | SB |
|---|---|---|---|---|---|---|---|---|
| | Layer common | | Layer specific | | | | | |
| | Oversampling | L Beam selection | Pattern | Cophasing | Strongest beam | WB amp | SB amp | SB phase |
| Layer 1 | 4 | 11 | 2/3 | 8 | 2 | 9 | 3S | 9S |
| Layer 2 | | | 2/3 | 8 | 2 | 9 | 3S | 9S |
| Layer 3 | | | 2/3 | 8 | 2 | 9 | 3S | 9S |
| Layer 4 | | | 2/3 | 8 | 2 | 9 | 3S | 9S |
| Total R Layers | 4 | 11 | 2R/3R | 8R | 2R | 9R | 3RS | 12RS |

In both phase codebook scenarios (i.e. 2 bit/3 bit phase codebooks in WB), the total feedback overhead required for rank 1-4 transmissions are calculated as $B_{Codebook\ II-a}^{tot}=15+22.5+18RS=825$ (bits), $B_{Codebook\ II-b}^{tot}=15+21/22R+15RS=699/703$ (bits).

Simulation Assumptions

TABLE 12

| Simulation parameters | |
|---|---|
| Channel model | 3D UMi 200 m ISD |
| eNB height | 10 m |
| Carrier frequency | 2 GHz |
| Bandwidth | 10 MHz |
| Oversampling ($O_1$, $O_2$) | (4, 4) |

TABLE 12-continued

| Simulation parameters | |
|---|---|
| eNB antenna configurations (H, V) × ($N_1$, $N_2$, P) | 32 ports: (4, 8) × (4, 4, 2) with (1 × 2) virtualization, 108 degree tilt |
| UE antenna configurations | 4 UE antennas: (2, 1, 2), $d_v$ = 0.8λ |
| Antenna polarizations | eNB (+45°, −45°) UE (0°, 90°) |

TABLE 12-continued

Simulation parameters

| | |
|---|---|
| eNB antenna spacing ($d_h$, $d_v$) | (0.5, 0.8)λ |
| eNB power | 41 dBm (UMi) |
| Cell layout | 57 cells |
| Traffic model | FTP Traffic Model 1, Non full buffer ($\lambda_{traffic}$ = 2, 3.5, 500 kB packet size) |
| Scheduling | MU, Proportional fair, Max 8 MU layers |
| HARQ | Max 4 retransmission |
| CSI mode | PUSCH mode 3-2 |
| CSI periodicity and CSI delay | 5 ms |
| UE speed | 3 km/h |
| Target BLER | 0.1 |
| Receiver | MMSE - IRC |
| Transmission rank | 1-4 |

Figure 15:
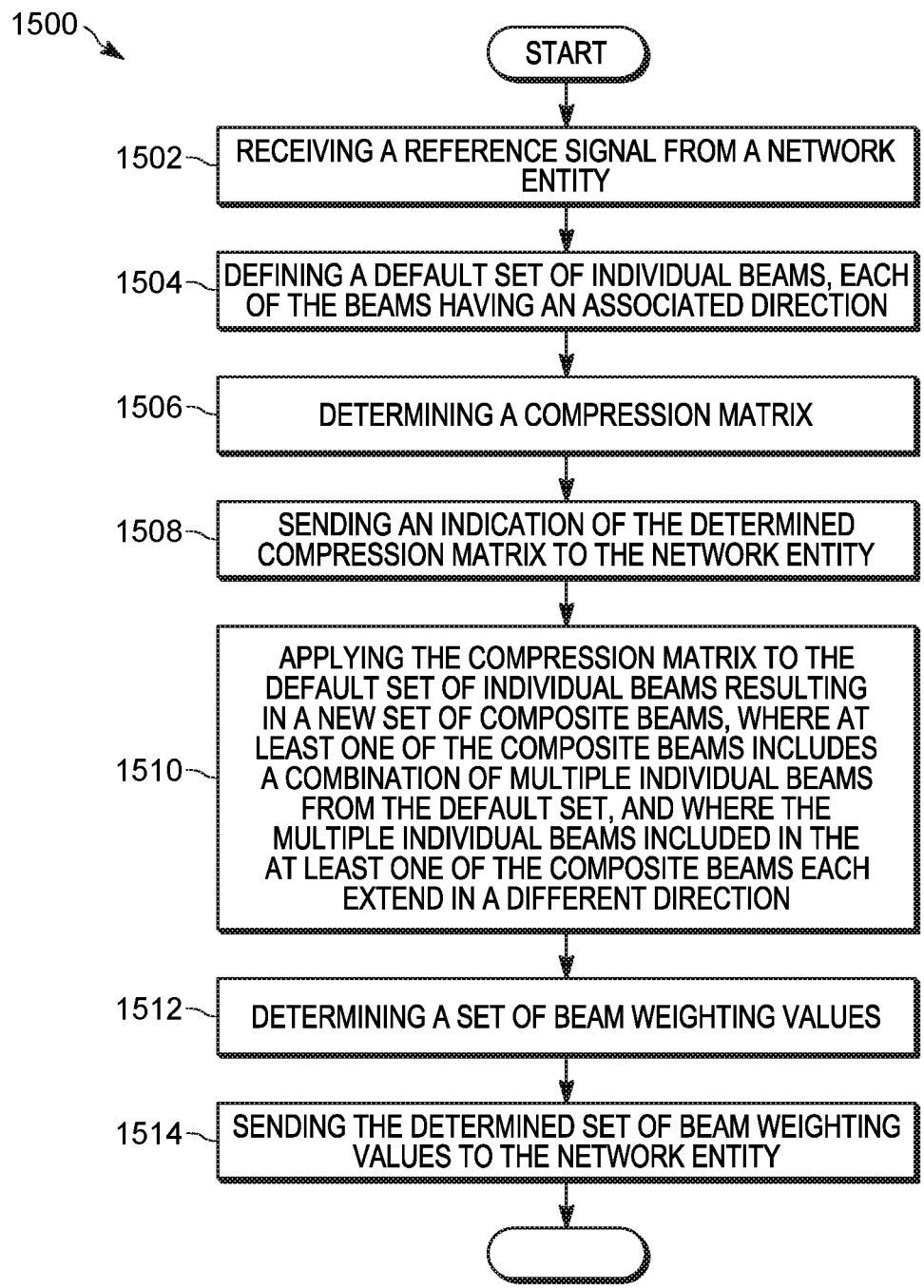
FIG. 15 is a flow diagram of a method in a wireless communication device for using a determined compression matrix to form a set of composite beams from a default set of individual beams in support of communicating with a network entity.

FIG. 15 illustrates a flow diagram 1500 of a method in a wireless communication device for using a determined compression matrix to form a set of composite beams from a default set of individual beams in support of communicating with a network entity. More specifically, a method in a wireless communication device is provided. The method includes receiving 1502 a reference signal from a network entity, and defining 1504 a default set of individual beams, each of the beams having an associated direction. The method further includes determining 1506 a compression matrix, and sending 1508 an indication of the determined compression matrix to the network entity. The compression matrix is applied 1510 to the default set of individual beams resulting in a new set of composite beams, where at least one of the composite beams includes a combination of multiple individual beams from the default set, and where the multiple individual beams included in the at least one of the composite beams each extend in a different direction. A set of beam weighting values is determined 1512, and the determined set of beam weighting values is sent 1514 to the network entity.

Further the method can include, determining the compression matrix to be applied to the default set of individual beams, which can result in the new set of composite beams can include selecting two compression sub-matrices representing a first layer, where each row of the first and second compression sub-matrix can have a single non-zero entry composed of a magnitude and a phase, and where the magnitude of each non-zero entry can be a member of set of magnitudes and the phase of each non-zero entry can be a member of a set of phases. A first and second compression sub-matrices can be selected for each additional layer of a set of layers according to the same steps given for selecting the two compression sub-matrices for the first layer. For each layer, a block diagonal compression matrix composed of an upper left matrix and a lower right matrix can be formed, where the upper left matrix can be the first compression sub-matrix, and the lower right matrix can be the second compression sub-matrix. Channel state information is transmitted to a base station, where the channel state information can include an indication of the block diagonal compression matrices corresponding to at least one layer.

In some instances, the magnitudes of the entries within a column of the compression sub-matrices can be identical. In some of these instances, the squared magnitude of each column of the first compression sub-matrix can equal the magnitude of the corresponding column in the second sub-matrix.

In some instances, the set of indices of the non-zero entries of the first compression sub-matrix can be equal to the set of indices of the non-zero entries of the second compression sub-matrix. In some of these instances, the magnitudes of the non-zero entries within a column of the compression sub-matrices can be identical. Additionally or alternatively, the magnitude and phase of a non-zero entry in the first compression sub-matrix can be equal to the magnitude and phase of the corresponding non-zero entry in the second compression sub-matrix. In some of these instances, the magnitudes and phases of the non-zero entries within a column of the compression sub-matrices can be identical. Furthermore, the indication of the block diagonal compression matrix can include an indication of the set of non-zero entries of the first and second compression sub-matrices.

In some instances, both compression sub-matrices may have only one column which contains only one non-zero entry.

In some instances, the sum of the square of the magnitudes of the non-zero entries of the columns of both compression sub-matrices can equal one.

In some instances, each column of a compression sub-matrix can have at least one non-zero entry with a phase of zero.

In some instances, the indication of the block diagonal compression matrix can include an indication of the set of non-zero entries in the first and second compression sub-matrices.

In some instances, the indication of the block diagonal compression matrix can include a first indication of the set of non-zero entries in the first compression sub-matrix and a second indication of the set of non-zero entries in the second compression sub-matrix.

In some instances, the indication of the block diagonal compression matrix can include an indication of the magnitudes of the non-zero entries in compression sub-matrices.

In some instances, the indication of the block diagonal compression matrix can include an indication of the magnitudes of the non-zero entries in compression sub-matrices.

In some instances, channel state information can include an indication of one or more beam directions. In some of these instances, can include an indication of the strongest beam direction.

In some instances, channel state information channel state information can include an indication of the number of layers in the set of layers.

Figure 16:
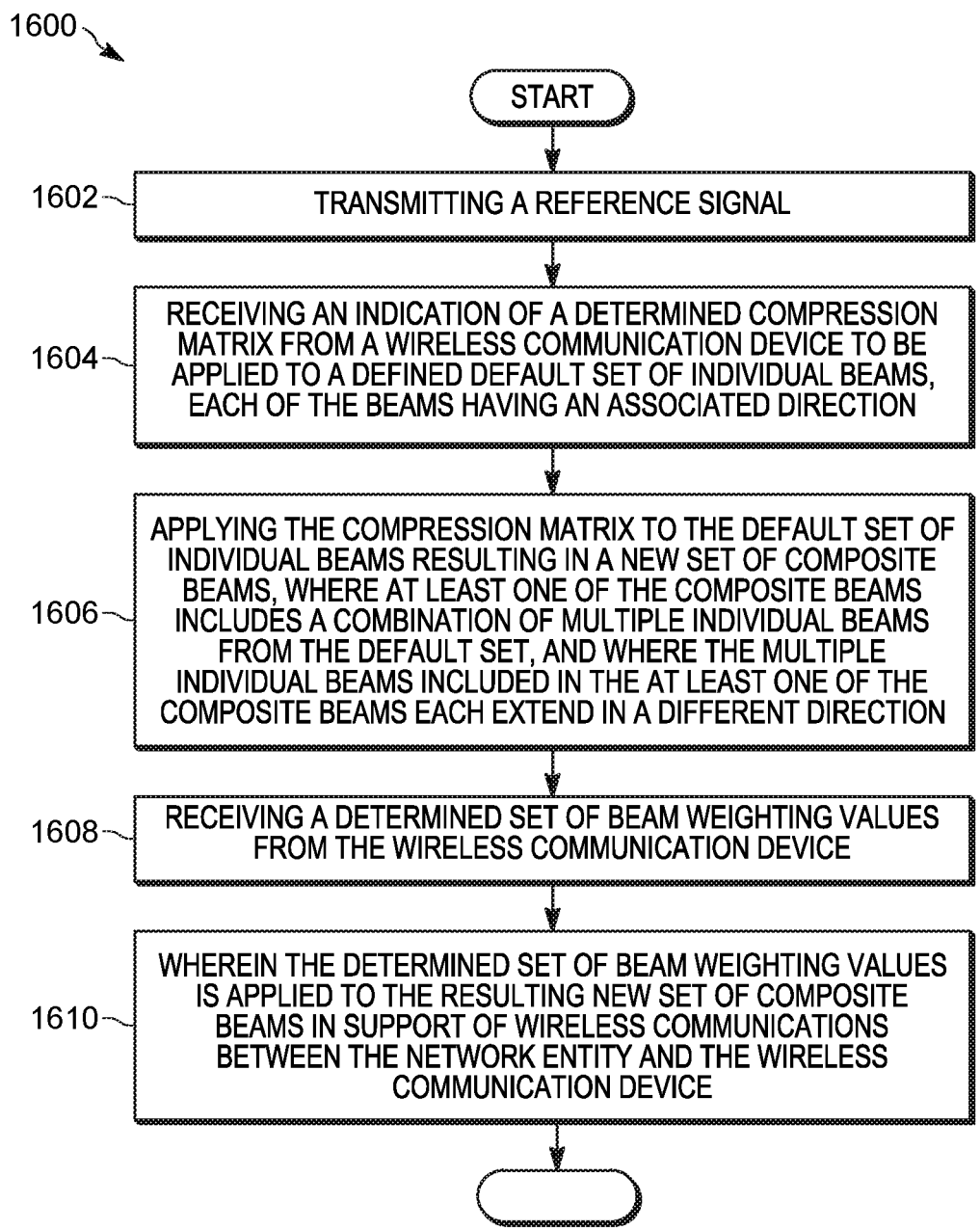
FIG. 16 is a flow diagram of a method in a network entity for supporting the use of a set of composite beams determined from a compression matrix received from the wireless communication device and applied to a default set of individual beams for communicating with the wireless communication device.

FIG. 16 illustrates a flow diagram 1600 of a method in a network entity for supporting the use of a set of composite beams determined from a compression matrix received from the wireless communication device and applied to a default set of individual beams for communicating with the wireless communication device. More specifically, a method in a network entity is provided. The method includes transmitting 1602 a reference signal, and receiving 1604 an indication of a determined compression matrix from a wireless communication device to be applied to a defined default set of individual beams, each of the beams having an associated direction. The compression matrix is applied 1606 to the default set of individual beams resulting in a new set of composite beams, where at least one of the composite beams includes a combination of multiple individual beams from the default set, and where the multiple individual beams included in the at least one of the composite beams each extend in a different direction. A determined set of beam weighting values is received 1608 from the wireless communication device. The determined set of beam weighting values is applied 1610 to the resulting new set of composite beams in support of wireless communications between the network entity and the wireless communication device.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 17:
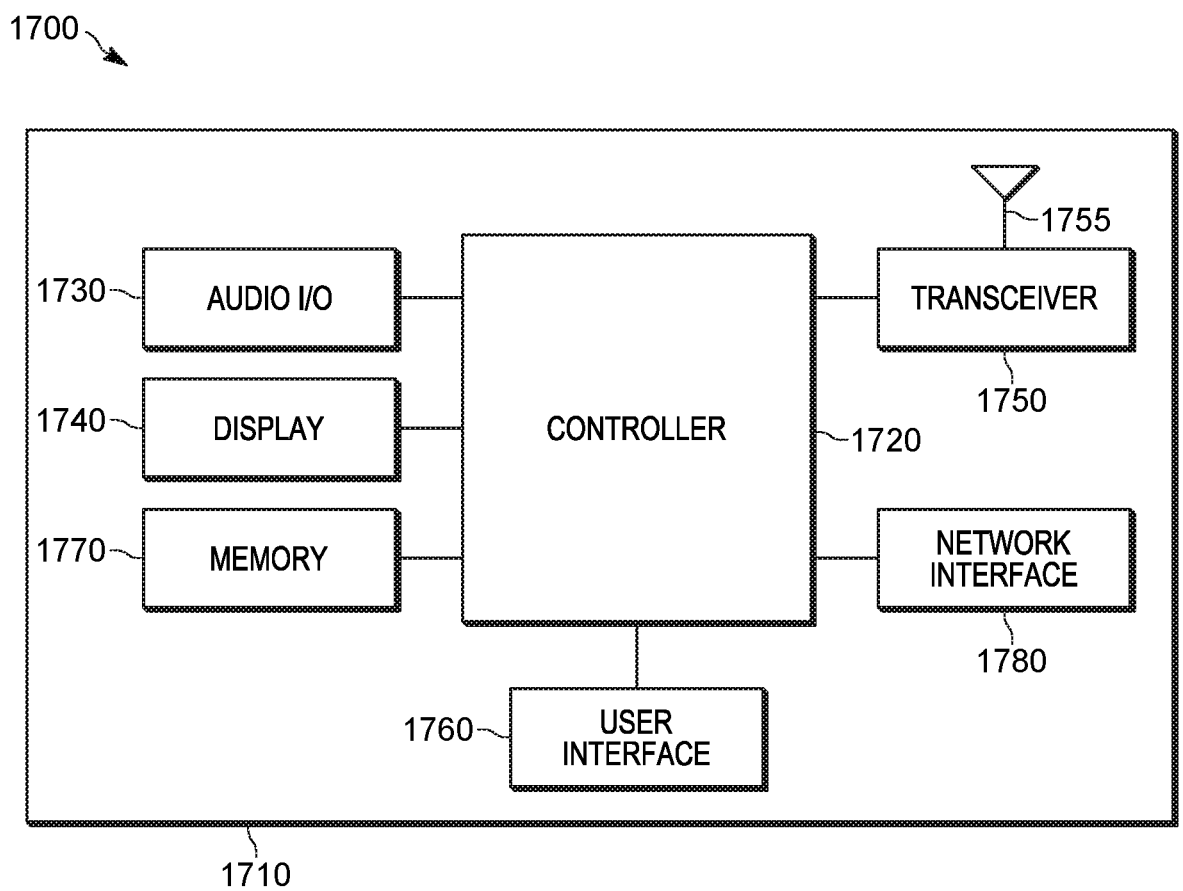
FIG. 17 is an example block diagram of an apparatus according to a possible embodiment.

FIG. 17 is an example block diagram of an apparatus 1700, such as the wireless communication device 110, according to a possible embodiment. The apparatus 1700 can include a housing 1710, a controller 1720 within the housing 1710, audio input and output circuitry 1730 coupled to the controller 1720, a display 1740 coupled to the controller 1720, a transceiver 1750 coupled to the controller 1720, an antenna 1755 coupled to the transceiver 1750, a user interface 1760 coupled to the controller 1720, a memory 1770 coupled to the controller 1720, and a network interface 1780 coupled to the controller 1720. The apparatus 1700 can perform the methods described in all the embodiments The display 1740 can be a viewfinder, a liquid crystal display (LCD), a light emitting diode (LED) display, a plasma display, a projection display, a touch screen, or any other device that displays information. The transceiver 1750 can include a transmitter and/or a receiver. The audio input and output circuitry 1730 can include a microphone, a speaker, a transducer, or any other audio input and output circuitry. The user interface 1760 can include a keypad, a keyboard, buttons, a touch pad, a joystick, a touch screen display, another additional display, or any other device useful for providing an interface between a user and an electronic device. The network interface 1780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1770 can include a random access memory, a read only memory, an optical memory, a solid state memory, a flash memory, a removable memory, a hard drive, a cache, or any other memory that can be coupled to an apparatus.

The apparatus 1700 or the controller 1720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1770 or elsewhere on the apparatus 1700. The apparatus 1700 or the controller 1720 may also use hardware to implement disclosed operations. For example, the controller 1720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1720 may be any controller or processor device or devices capable of operating an apparatus and implementing the disclosed embodiments. Some or all of the additional elements of the apparatus 1700 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a wireless communication device comprising:
   receiving a reference signal from a network entity;
   defining a default set of individual beams, each of the beams having an associated direction;
   determining a compression matrix;
   sending an indication of the determined compression matrix to the network entity;
   applying the compression matrix to the default set of individual beams resulting in a new set of composite beams, where at least one of the composite beams includes a combination of multiple individual beams from the default set, and where the multiple individual beams included in the at least one of the composite beams each extend in a different direction;

determining a set of beam weighting values; and sending the determined set of beam weighting values to the network entity; and wherein determining the compression matrix to be applied to the default set of individual beams, which results in the new set of composite beams includes selecting two compression sub-matrices including a first and a second compression sub-matrix representing a first layer of a set of layers, wherein each row of the first and the second compression sub-matrix has a single non-zero entry composed of a magnitude and a phase, and wherein the magnitude of each non-zero entry is a member of a set of magnitudes, and the phase of each non-zero entry is a member of a set of phases;

selecting a first and a second compression sub-matrices for each additional layer of the set of layers according to a same criteria given for selecting the two compression sub-matrices for the first layer including wherein each row of the first and the second compression sub-matrix has a single non-zero entry composed of a magnitude and a phase, and wherein the magnitude of each non-zero entry is a member of the set of magnitudes, and the phase of each non-zero entry is a member of the set of phases, for each layer, forming a block diagonal compression matrix composed of an upper left matrix and a lower right matrix, wherein the upper left matrix is the first compression sub-matrix for the layer, and wherein the lower right matrix is the second compression sub-matrix for the layer; and transmitting channel state information to the network entity;

wherein the channel state information includes an indication of the block diagonal compression matrices corresponding to at least one layer.

2. The method of claim 1 wherein the magnitudes of the entries within a column of the compression sub-matrices are identical.

3. The method of claim 2 wherein the squared magnitude of each column of the first compression sub-matrix equals the magnitude of the corresponding column in the second sub-matrix.

4. The method of claim 1 wherein the set of indices of the non-zero entries of the first compression sub-matrix is equal to the set of indices of the non-zero entries of the second compression sub-matrix.

5. The method of claim 4 wherein the magnitudes of the non-zero entries within a column of the compression sub-matrices are identical.

6. The method of claim 4 wherein the magnitude and phase of a non-zero entry in the first compression sub-matrix is equal to the magnitude and phase of the corresponding non-zero entry in the second compression sub-matrix.

7. The method of claim 6 wherein the magnitudes and phases of the non-zero entries within a column of the compression sub-matrices are identical.

8. The method of claim 4 wherein the indication of the block diagonal compression matrix includes an indication of the set of non-zero entries of the first and second compression sub-matrices.

9. The method of claim 1 wherein both compression sub-matrices have only one column which contains only one non-zero entry.

10. The method of claim 1 wherein the sum of the square of the magnitudes of the non-zero entries of the columns of both compression sub-matrices equals one.

11. The method of claim 1 wherein each column of a compression sub-matrix has at least one non-zero entry with a phase of zero.

12. The method of claim 1 wherein the indication of the block diagonal compression matrix includes an indication of the set of non-zero entries in the first and second compression sub-matrices.

13. The method of claim 1 wherein the indication of the block diagonal compression matrix includes a first indication of the set of non-zero entries in the first compression sub-matrix and a second indication of the set of non-zero entries in the second compression sub-matrix.

14. The method of claim 1 wherein the indication of the block diagonal compression matrix includes an indication of the magnitudes of the non-zero entries in compression sub-matrices.

15. The method of claim 1 wherein the indication of the block diagonal compression matrix includes an indication of the magnitudes of the non-zero entries in compression sub-matrices.

16. The method of claim 1 wherein channel state information includes an indication of one or more beam directions.

17. The method of claim 16 wherein channel state information includes an indication of the strongest beam direction.

18. The method of claim 1 wherein channel state information includes an indication of the number of layers in the set of layers.

19. A wireless communication device comprising:

a transceiver that receives a reference signal from a network entity, and communicates wirelessly with the network entity using a resulting new set of composite beams; and a controller that defines a default set of individual beams, each of the beams having an associated direction of extension;

wherein the controller further determines a compression matrix, and applies the compression matrix to the default set of individual beams resulting in a new set of composite beams, as well as sends an indication of the determined compression matrix to the network entity, where at least one of the composite beams includes a combination of multiple individual beams from the default set, and where the multiple individual beams included in the at least one of the composite beams each extend in a different direction; and wherein a set of beam weighting values is determined and sent to the network entity; and wherein determining the compression matrix to be applied to the default set of individual beams, which results in the new set of composite beams includes selecting two compression sub-matrices including a first and a second compression sub-matrix representing a first layer of a set of layers, wherein each row of the first and the second compression sub-matrix has a single non-zero entry composed of a magnitude and a phase, and wherein the magnitude of each non-zero entry is a member of a set of magnitudes, and the phase of each non-zero entry is a member of a set of phases;

selecting a first and a second compression sub-matrices for each additional layer of the set of layers according to a same criteria given for selecting the two compression sub-matrices for the first layer including wherein each row of the first and the second compression sub-matrix has a single non-zero entry composed of a magnitude and a phase, and wherein the magnitude of each non-zero entry is a member of the set of magnitudes, and the phase of each non-zero entry is a member of the set of phases, for each layer, forming a block diagonal compression matrix composed of an upper left matrix and a lower right matrix,
    wherein the upper left matrix is the first compression sub-matrix for the layer, and
    wherein the lower right matrix is the second compression sub-matrix for the layer; and transmitting channel state information to the network entity;

wherein the channel state information includes an indication of the block diagonal compression matrices corresponding to at least one layer.

20. The method of claim 1, wherein the default set of individual beams is common for all layers, and the determined compression matrix is not the same for all layers.

* * * * *